United States Patent
Nakata

(10) Patent No.: US 7,835,067 B2
(45) Date of Patent: Nov. 16, 2010

(54) RAMAN AMPLIFIER

(75) Inventor: Masao Nakata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/960,366

(22) Filed: Dec. 19, 2007

(65) Prior Publication Data
US 2008/0123180 A1     May 29, 2008

Related U.S. Application Data

(63) Continuation of application No. PCT/JP2005/011298, filed on Jun. 20, 2005.

(51) Int. Cl.
*H04B 10/17*     (2006.01)
*H04B 10/12*     (2006.01)

(52) U.S. Cl. .................................................. 359/334

(58) Field of Classification Search ................. 359/334
See application file for complete search history.

(56) References Cited

U.S. PATENT DOCUMENTS

| | | | | |
|---|---|---|---|---|
| 6,388,801 | B1* | 5/2002 | Sugaya et al. | 359/334 |
| 6,441,951 | B1* | 8/2002 | Tanaka et al. | 359/334 |
| 6,462,861 | B2* | 10/2002 | Ohshima et al. | 359/334 |
| 6,577,437 | B2* | 6/2003 | Sugaya et al. | 359/334 |
| 2002/0041431 | A1* | 4/2002 | Ohshima et al. | 359/334 |
| 2002/0140927 | A1 | 10/2002 | Sobe et al. | |
| 2002/0176154 | A1 | 11/2002 | Sugaya et al. | |
| 2003/0117694 | A1 | 6/2003 | Sobe et al. | |
| 2004/0090663 | A1 | 5/2004 | Kamada et al. | |
| 2004/0160664 | A1 | 8/2004 | Sobe et al. | |
| 2004/0196158 | A1 | 10/2004 | Sugaya et al. | |
| 2005/0024712 | A1* | 2/2005 | Hiraizumi et al. | 359/334 |
| 2005/0105167 | A1 | 5/2005 | Martinelli et al. | |

FOREIGN PATENT DOCUMENTS

| | | |
|---|---|---|
| EP | 1182808 | 2/2002 |
| EP | 1522840 A1 | 4/2005 |
| JP | 2002-296145 | 10/2002 |
| JP | 2004-172750 | 6/2004 |
| JP | 2004-287307 | 10/2004 |
| JP | 2004-361979 | 12/2004 |
| WO | 2005/013518 A1 | 2/2005 |

OTHER PUBLICATIONS

Jake Bromage, "Raman Amplification for Fiber Communications Systems", IEEE Journal of Lightwave Technology, vol. 22, No. 1, Jan. 2004, pp. 79-93.
International Search Report (PCT/ISA/210) mailed Sep. 27, 2005 for the International Application PCT/JP2005/011298.
Supplementary European Search Report, mailed by the European Patent Office on Jan. 19, 2010, in corresponding European patent application No. 05751389.7.

\* cited by examiner

*Primary Examiner*—Eric Bolda
(74) *Attorney, Agent, or Firm*—Fujitsu Patent Center

(57) ABSTRACT

When pump light is supplied to a transmission line fiber from a downstream station toward an upstream station and signal light from the upstream station is Raman-amplified, a corresponding intensity of amplified spontaneous scattering light is calculated from a required Raman gain by using a correlation between a Raman gain and the intensity of amplified spontaneous scattering light that occurs with Raman amplification, and further a target light intensity is calculated from the obtained intensity of the amplified spontaneous scattering light and the intensity of the amplified signal light. Then, the intensity of the pump light is controlled so that the intensity of light, which is measured by the downstream station, becomes equivalent to the target light intensity.

10 Claims, 18 Drawing Sheets

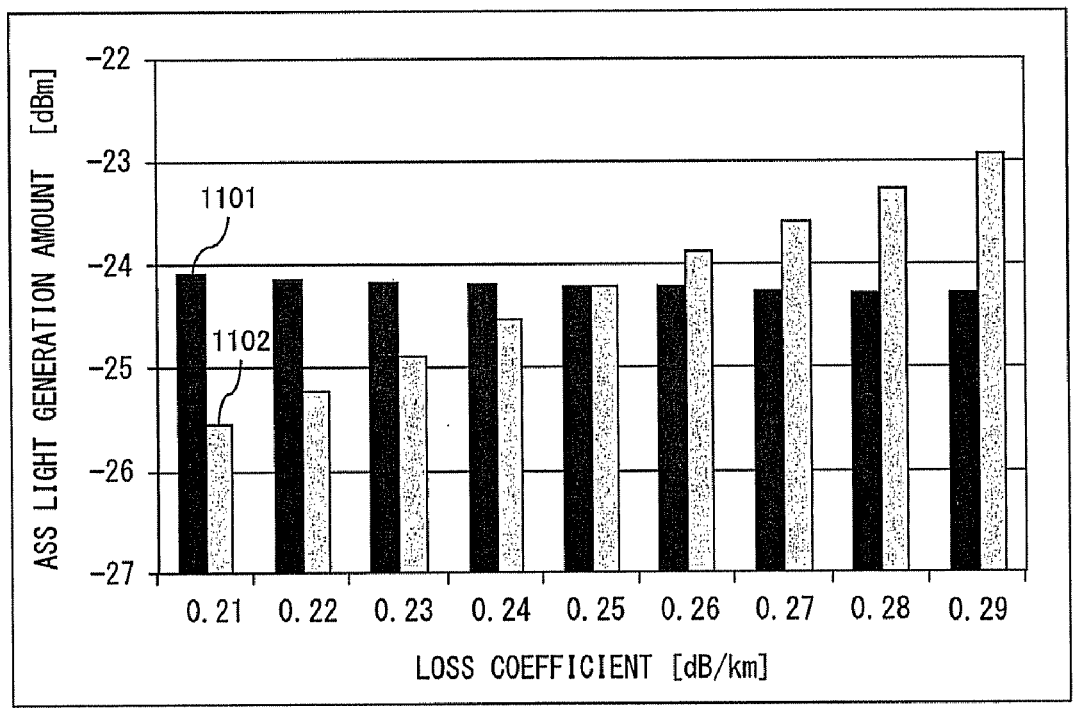
F I G. 1 1

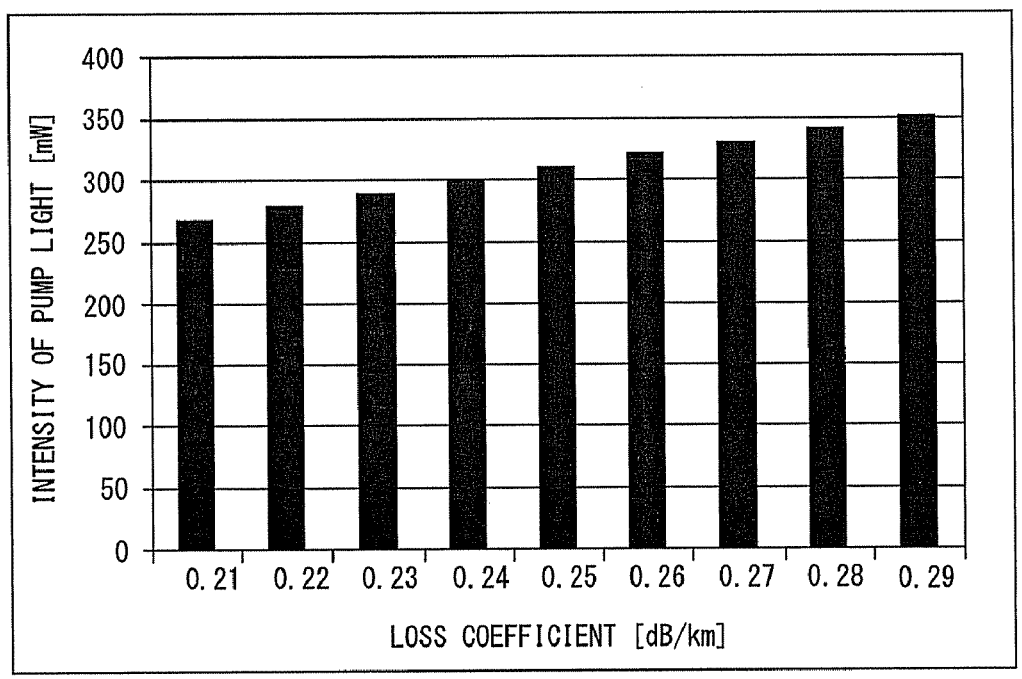
F I G. 1 2

| RAMAN GAIN | | 10dB | | | | 13dB | | |
|---|---|---|---|---|---|---|---|---|
| LOSS COEFFICIENT | | 0.21dB/km | 0.25dB/km | 0.29dB/km | 0.21dB/km | 0.25dB/km | 0.29dB/km |
| INTENSITY OF PUMP LIGHT | (mW) | 268 | 310 | 351 | 346 | 399 | 454 |
| ASS LIGHT GENERATION AMOUNT | (dBm) | −24.1 | −24.2 | −24.3 | −21.4 | −21.5 | −21.6 |
| ESTIMATION OF ASS LIGHT | CONVENTIONAL TECHNIQUE (dBm) | −25.5 | −24.2 | −22.9 | −22.9 | −21.5 | −20.0 |
| | PRESENT INVENTION (dBm) | −24.2 | −24.2 | −24.2 | −21.5 | −21.5 | −21.5 |

FIG. 16

US 7,835,067 B2

RAMAN AMPLIFIER

CROSS REFERENCE TO RELATED APPLICATION

This application is a continuation application of International PCT Application No. PCT/JP2005/011298 which was filed on Jun. 20, 2005.

BACKGROUND OF THE INVENTION

1. Field of the Invention

The present invention relates to a Raman amplifier for amplifying signal light for an optical communication, an optical communication system comprising the Raman amplifier, and a controlling device of the Raman amplifier.

2. Description of the Related Art

Raman amplifiers are being put into practical use as a technique for building a network for a long-distance transmission optical communication system that can perform large-capacity communications. The Raman amplifier uses an optical fiber as an amplification medium by making pump light having a high intensity be incident to a transmission line fiber.

The Raman amplifier uses the physical phenomenon whereby a Raman amplification effect occurs in the wavelength range that depends on the wavelength of pump light, as shown in FIG. 1, as a result of making the pump light having a certain wavelength be incident to an optical fiber. In the example shown in FIG. 1, Raman gains 111 to 113 are respectively generated by pump lights 101 to 103 having different wavelengths. For quartz glass used as an optical fiber, its maximum amplification characteristic exists in the wavelength range of a frequency that is lower than the wavelength of pump light by approximately 13.2 THz. Accordingly, to Raman-amplify, for example, signal light in the vicinity of 1550 nm, a Raman gain can be efficiently obtained if pump light having a wavelength in the vicinity of 1450 nm is used.

In an optical communication system in which signal light of a broad wavelength range must be collectively amplified, as in a WDM (Wavelength Division Multiplexing) transmission, the amplification characteristic of a broad wavelength range according to the intensities and the wavelengths of pump lights can be obtained by using a plurality of pump lights having mutually different wavelengths, and by respectively controlling the intensities of the pump lights.

To control a desired amplification characteristic, the Raman amplifier normally has the ability to adjust the intensity of pump light so that a predetermined gain can be obtained while monitoring the intensity of signal light. Meanwhile, amplified spontaneous scattering (ASS) light occurs within a fiber with the Raman amplification effect within the optical fiber.

This ASS light occurs in the same direction as the transmission direction and in the same wavelength range as the signal light. Therefore, the ASS light mixes as a noise component along with the signal light when the intensity of the signal light is monitored. Accordingly, the Raman amplifier has the ability to detect the intensity of a signal light by subtracting the ASS light generation amount, which is a noise component, in order to obtain a predetermined signal light intensity.

As a technique for obtaining information about the ASS light generation amount, there is a method for deriving a relational expression between the intensity of pump light and the ASS light generation amount for an optical fiber having a certain optical characteristic, and for calculating the ASS light generation amount from a monitored intensity of pump light pursuant to the relational expression, since it is known that the ASS light generation amount has a correlation with the intensity of pump light made incident to an optical fiber.

For example, a Raman amplifier is provided with the ability to monitor the intensity of pump light made incident to an optical fiber, and a relational expression between the intensity of pump light and the ASS light generation amount is stored in a storage element within the Raman amplifier and used for a computation process, whereby the ASS light generation amount can be calculated from the monitored intensity of pump light.

However, the following problems must be overcome to realize an optical communication system comprising a Raman amplifier for implementing a long-distance transmission.

(1) Since a Raman amplifier uses an optical fiber, which is a transmission line, as an amplification medium, individual differences occur in the optical characteristics of transmission line fibers due to a) local optical loss which occurs at a site where the Raman amplifier is placed, such as loss in the connecting portion of an optical fiber connected to the Raman amplifier, bending loss, etc.; b) the manufacturing process of an optical fiber; and c) the elapsed time/temperature environment.

If pump light having the same intensity is made incident to optical fibers the optical characteristics of which differ due to the above described factors a) to c), then the degree of Raman amplification resultant from the Raman scattering effect according to the optical characteristic of a transmission line fiber and the ASS light generation amount that occurs as a noise component with the Raman amplification are different. As a result, with the conventional method for estimating the ASS light generation amount from the intensity of pump light, the accuracy of estimation deteriorates, leading to difficulties in the accurate calculation of the intensity of signal light from which the ASS light generation amount is subtracted.

In a long-distance transmission, the intensity of signal light must be calculated/monitored by correcting ASS light as a noise component, and a satisfactory transmission characteristic must be obtained in each optical amplifier that configures an optical communication system. Accordingly, improving the accuracy of estimation of the ASS light generation amount in a Raman amplifier is necessary to realizing improved long-distance transmission characteristics.

(2) If an optical communication system encounters an abnormal condition due to a cause such as a fault in an upstream station, the disconnection of a transmission line, etc., the abnormality must be detected and the system must be automatically shut down. The Raman amplifier has the ability to detect the presence/absence of signal light by monitoring the intensity of the signal light in order to detect the above described abnormality. When this detection capability detects that the signal light does not reach, it transmits a message that communications are abnormal, and shuts down the system.

However, since ASS light mixes along with the signal light as a result of the Raman amplification, the accuracy of detecting the presence/absence of signal light becomes problematic in some cases. In particular, in a WDM transmission using a broad wavelength range, the number of mixed noise components becomes large. Therefore, it is sometimes undetectable that a signal light is not reaching if the accuracy of estimation of ASS light is low. This poses a problem from the viewpoint of security of an optical communication system.

The following methods for estimating/correcting the ASS light generation amount are known as conventional techniques that overcome these problems.

(1) Patent Document 1

The loss distribution of an optical fiber to which a Raman amplifier is connected is measured with a measurement instrument such as an optical time domain reflectometer, etc., prior to the placement of the Raman amplifier. Additionally, the ASS light generation amount, which is measured beforehand in accordance with the intensity of pump light, and the characteristic of the optical fiber is stored in a storage element within the amplifier. Then, the ASS light generation amount in accordance with the individual differences of the optical characteristics of the optical fibers is estimated by inputting the optical characteristic of the optical fiber, which is obtained by measurement, into the Raman amplifier as input information when the Raman amplifier is set up, and by extracting and using information suitable for the characteristic of the optical fiber from the storage element.

(2) Patent Document 2

Pump light is made to be incident from a Raman amplifier to a transmission line in a state in which signal light is intercepted when the Raman amplifier is set up, and a correlation between the intensity of pump light and the ASS light generation amount of a connected optical fiber is measured. Then, the current ASS light generation amount is estimated from the ASS light generation amount that was measured when the Raman amplifier was set up in accordance with the monitored intensity of pump light when the optical communication system is operated. Otherwise, the accuracy of estimation of the ASS light generation amount is improved by applying a correction based on the ASS light generation amount that is measured at the set-up time to a prepared calculation expression of the ASS light generation amount.

However, the following problems still remain in the above described methods (1) and (2).

With the above described method (1), the length of time taken to make the measurement beforehand in the design phase of the Raman amplifier and the amount of information stored in the Raman amplifier increase as the individual differences in the optical characteristics of an optical fiber connected to the Raman amplifier become large, leading to inefficiencies. Furthermore, an error in the estimation of the ASS light generation amount caused by a mismatch between optical characteristics occurs if the optical characteristic of the connected optical fiber and that of an optical fiber that is measured beforehand or stored do not match and information about an optical fiber having a similar optical characteristic is used.

With the above described method (2), the ASS light generation amount must be measured under a condition in which signal light does not pass through. Therefore, procedures for preparing system operations become complicated. Furthermore, if the intensity of pump light at the time of system operations and that of pump light that is measured when the Raman amplifier is set up do not match (if the ratios of the intensities of pump lights do not match when the wavelengths of the plurality of pump lights are used), then the accuracy of estimation of the ASS light generation amount deteriorates.

In addition, with the above described methods (1) and (2), a correction is made on the basis of measurement information obtained in the design phase of the system or prior to the operation of the system. Therefore, if the optical characteristic of an optical fiber varies with a secular/environmental change, then the degree of Raman amplification and the ASS light generation amount will also vary at the same time.

However, a change in the fiber characteristic is not considered when the ASS light generation amount, which occurs with the Raman amplification, is estimated from the intensity of pump light made incident to a transmission line fiber.

Accordingly, a correlation between a Raman gain, the ASS light generation amount, and the intensity of pump light varies in an optical fiber in which the optical characteristic varies with long term system operations. Therefore, estimation of the ASS light generation amount at a high level of accuracy cannot be guaranteed. This leads to a problem in which the accuracy of estimation deteriorates because a calculation formula for accurately estimating the ASS light generation amount cannot be corrected to cope with a change in the ASS light generation amount that occurs with a change in the optical characteristic of the optical fiber.

Furthermore, for example, the method recited in Patent Document 3 is known as a conventional technique for monitoring the state of a transmission line fiber. With this method, the ability to monitor the intensity of pump light that proceeds in reverse to signal light within a transmission line fiber is comprised to monitor faults such as the disconnection of a transmission line fiber, the opening of an optical connecting portion, and the like. However, the ability to monitor a change in the optical characteristic of the optical fiber that is caused by a secular/environmental change is not comprised.

Patent Document 1: Japanese Published Unexamined Patent Application No. 2002-296145
Patent Document 2: Japanese Published Unexamined Patent Application No. 2004-287307
Patent Document 3: Japanese Published Unexamined Patent Application No. 2004-172750

As described above, the optical characteristic of a transmission line of an optical transmission system using a Raman amplifier normally varies by system. For this reason, an obtained Raman gain and the intensity of ASS light that occurs as a noise component vary in accordance with the optical characteristic of a transmission line, which serves as an amplification medium, even if pump light having the same intensity is made incident to the transmission line fiber.

For example, if a Raman gain and the ASS light generation amount are calculated only from information on the intensities of the pump light and signal light, which are monitored by a Raman amplifier, as in a conventional technique, information on the transmission line will be lacking. Therefore, the pump light is controlled on the basis of transmission line information on the optical characteristic of a representative optical fiber used as a reference.

Because the optical characteristic of a transmission line to which a Raman amplifier is connected is different from that of the optical fiber that is used as a reference, in most cases the ASS light generation amount and the Raman gain in an actual transmission line are different from those estimated by the Raman amplifier. Accordingly, an accurate ASS light generation amount cannot be used when the ASS light generation amount is subtracted from the total intensity of light including signal light and the ASS light. As a result, the intensity of the signal light cannot be accurately grasped.

Patent Document 1 recites the method for measuring the optical characteristic of a transmission line beforehand and for compensating for a mismatch between transmission line characteristics by correcting the estimation error of the ASS light generation amount; this method is recited as a solution to a problem in which the ASS light generation amount cannot be accurately calculated due to a lack of information about the transmission line connected to a Raman amplifier. The measurement of an optical characteristic is an operation performed at the time of the setting up of a Raman amplifier during the preparatory phase before operations are begun. Therefore, suitable corrections are not made to changes in the optical characteristic of a transmission line fiber that occur during operations.

SUMMARY OF THE INVENTION

An object of the present invention is to provide a Raman amplifier that can obtain a satisfactory gain characteristic even if the amplifier is used in an optical transmission system in which the optical characteristic of a transmission line is different, by improving the accuracy of estimation of the ASS light generation amount.

Another object of the present invention is to provide a Raman amplifier that can accurately detect the intensity of signal light even if the amplifier is used in an optical transmission system in which the optical characteristic of a transmission line is different.

A further object of the present invention is to correct, with a simple configuration, the estimation error of the ASS light generation amount that occurs with a change in the optical characteristic of a transmission line caused by individual differences in the optical characteristics of transmission line fibers used, or caused by a secular/environmental change.

A Raman amplifier according to the present invention comprises a pump light source, a signal light monitoring unit, a target calculating unit, and a pump light controlling unit. The Raman amplifier amplifies signal light, which includes communication information from an upstream station, by using a transmission line fiber, and receives the amplified signal light.

The pump light source supplies pump light to the transmission line fiber toward the upstream station, and the signal light monitoring unit measures the intensity of the received signal light. The target calculating unit calculates the corresponding intensity of amplified spontaneous scattering light from a required Raman gain by using a correlation between a Raman gain and the intensity of amplified spontaneous scattering light that occurs with Raman amplification, and calculates a target light intensity from the obtained intensity of the amplified spontaneous scattering light and the intensity of the amplified signal light. The pump light controlling unit controls the intensity of pump light output from the pump light source so that the intensity of light measured by the signal light monitoring unit becomes equivalent to the target light intensity.

BRIEF DESCRIPTION OF THE DRAWINGS

FIG. 11 shows differences between the results of conventional estimations of the ASS light generation amount and an actual ASS light generation amount;

FIG. 12 shows a relationship between the loss coefficient of a transmission line fiber and the intensity of pump light required to obtain a predetermined Raman gain;

FIG. 16 shows the results of estimation of the ASS light generation amount obtained with a conventional technique and with a method according to the present invention;

DESCRIPTION OF THE PREFERRED EMBODIMENTS

The best mode for carrying out the present invention is described in detail below with reference to the drawings.

In the preferred embodiment, transmission line information such as the loss value of a transmission line fiber including losses within a receiving end station, the transmission line information representing the optical characteristic of the transmission line fiber, is monitored continuously on the basis of a light intensity difference between a residual pump light intensity monitored by a light receiving element placed in an upstream transmitting end station and the intensity of pump light made incident, from a Raman amplifier placed in a downstream receiving end station, to the transmission line fiber.

Additionally, a Raman gain is monitored continuously on the basis of the loss of a transmission line, which is obtained from the above described light intensity difference, the intensity of signal light output from the transmitting end station, and the intensity of signal light after being Raman-amplified, which is received by the Raman amplifier of the receiving end station.

Furthermore, the Raman gain and the intensity of signal light can be made to match predetermined target values with a high accuracy by using a calculation formula for estimating the ASS light generation amount that occurs in a transmission line fiber on the basis of the intensity of pump light made incident to a transmission line and the continuously monitored Raman gain, even if a Raman amplifier is connected to a transmission line having a different optical characteristic.

Accordingly, a Raman gain and the optical loss of a transmission line can be monitored continuously during operations, and also the intensity of a Raman-amplified signal light can be grasped with a high accuracy, whereby the gain control of a Raman amplifier in an optical communication system can be accurately performed.

Figure 2:
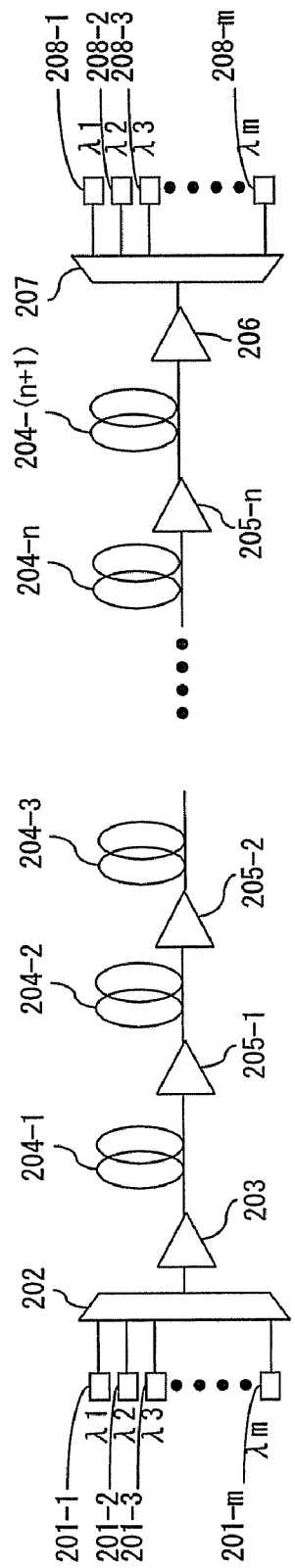
FIG. 2 shows a configuration of an optical transmission system.

FIG. 2 shows a configuration example of an optical transmission system where such Raman amplifiers are placed. The optical transmission system shown in FIG. 2 is a WDM transmission system where information is superimposed on a wavelength-multiplexed optical signal and transmitted between transmitting and receiving end stations, and n repeater stations 205-1 to 205-n are placed on a transmission line that links the end stations.

In the transmitting end station are placed m transmitters 201-1 to 201-m, a multiplexer 202, and a pre-amplifier 203. The transmitters 201-1 to 201-m respectively generate signal lights having wavelengths λ1 to λm, and the multiplexer 202 wavelength-multiplexes the signal lights. The pre-amplifier 203 amplifies the output of the multiplexer 202 to a signal light of a high intensity beforehand for the purpose of compensating for an optical loss in the transmission line, and transmits the signal light to the transmission line.

The pre-amplifier 203 and the repeater station 205-1 are linked by a transmission line fiber 204-1, and the repeater stations 205-i and 205-(i+1) are linked by a transmission line fiber 204-(i+1) (i=1, 2, . . . , n−1). Additionally, the repeater station 205-n and a pre-amplifier 206 are linked by a transmission line fiber 204-(n+1). In each of the repeater stations, either or both of a rare-earth doped optical fiber amplifier and a Raman amplifier are placed as optical amplifiers for amplifying signal light, which becomes weak due to the optical loss of an upstream transmission line fiber, and for transmitting the amplified signal light to a downstream transmission line fiber.

In the receiving end station are placed the pre-amplifier 206, a demultiplexer 207, and m receivers 208-1 to 208-m. The pre-amplifier 206 amplifies the signal light that becomes weak due to the optical loss of the transmission line fiber 204-(n+1) after being output from the repeater station 205-n, and transmits the signal light to the demultiplexer 207. The demultiplexer 207 generates signal lights having respective wavelengths by wavelength-demultiplexing the signal light, and the receivers 208-1 to 208-m respectively receive these signal lights.

Figure 3:
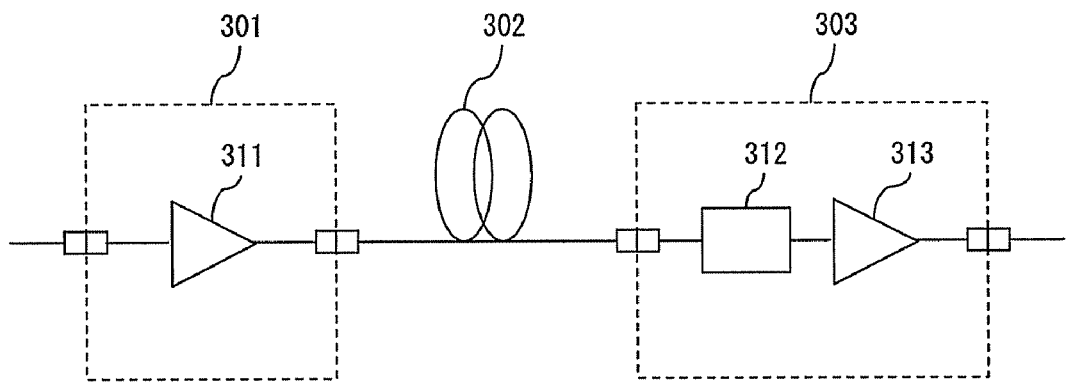
FIG. 3 shows upstream and downstream repeater stations.

FIG. 3 shows a configuration example of intra-station transmitting devices of upstream and downstream repeater stations, which are included in the optical transmission system shown in FIG. 2 and are adjacent to the transmission line fiber interposed in between. In the example shown in FIG. 3, an upstream repeater station 301 and a downstream repeater station 303 are linked by a transmission line fiber 302. An EDFA (Erbium Doped Fiber Amplifier) 311, which is a rare-earth doped optical fiber amplifier, is placed in the upstream repeater station 301, whereas a fiber Raman amplifier (FRA) 312 and an EDFA 313 are placed in the downstream repeater station 303.

As another configuration example, an FRA similar to that of the downstream repeater station 303 can also be placed in the upstream repeater station 301.

Figure 4:
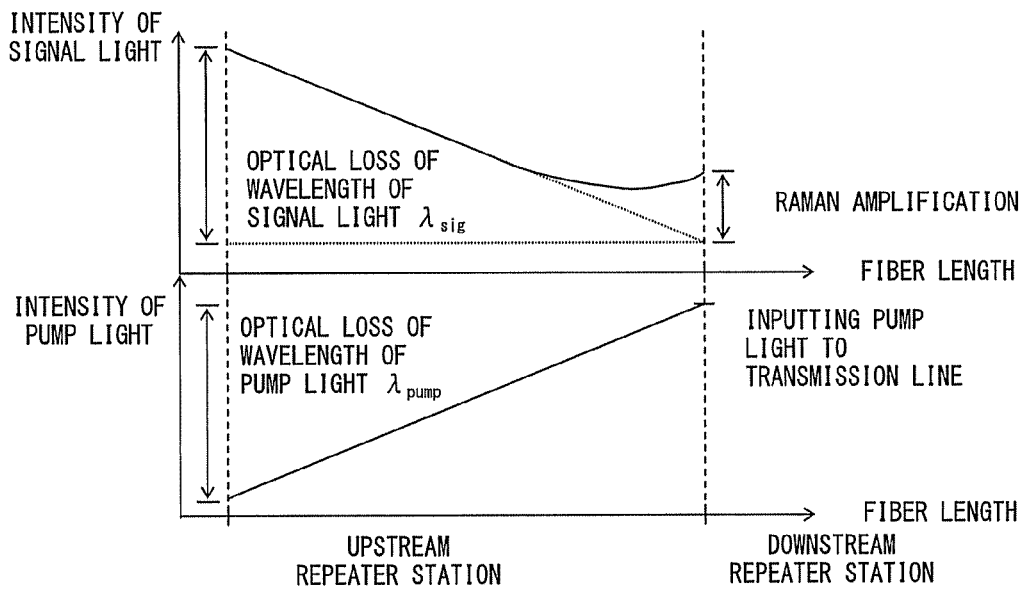
FIG. 4 shows the intensity distributions of signal light and pump light within a transmission line fiber.

FIG. 4 shows the intensity distributions of signal light and pump light within the transmission line fiber 302 of FIG. 3. The signal light for which the intensity becomes high by being amplified by the EDFA 311 is transmitted from the upstream repeater station 301 to the transmission line fiber 302, and further transmitted to the downstream repeater station 303 while its intensity is being lost due to an optical loss in the transmission line.

In the meantime, the pump light from the Raman amplifier 312 of the downstream repeater station 303, which propagates in a reverse direction to the signal light, is made to be incident to the transmission line fiber 302 so that the signal light is Raman-amplified and its intensity increases. Then, the signal light is transmitted to the next transmission line fiber after its intensity is further amplified by the EDFA 313 of the downstream repeater station 303.

Figure 5:
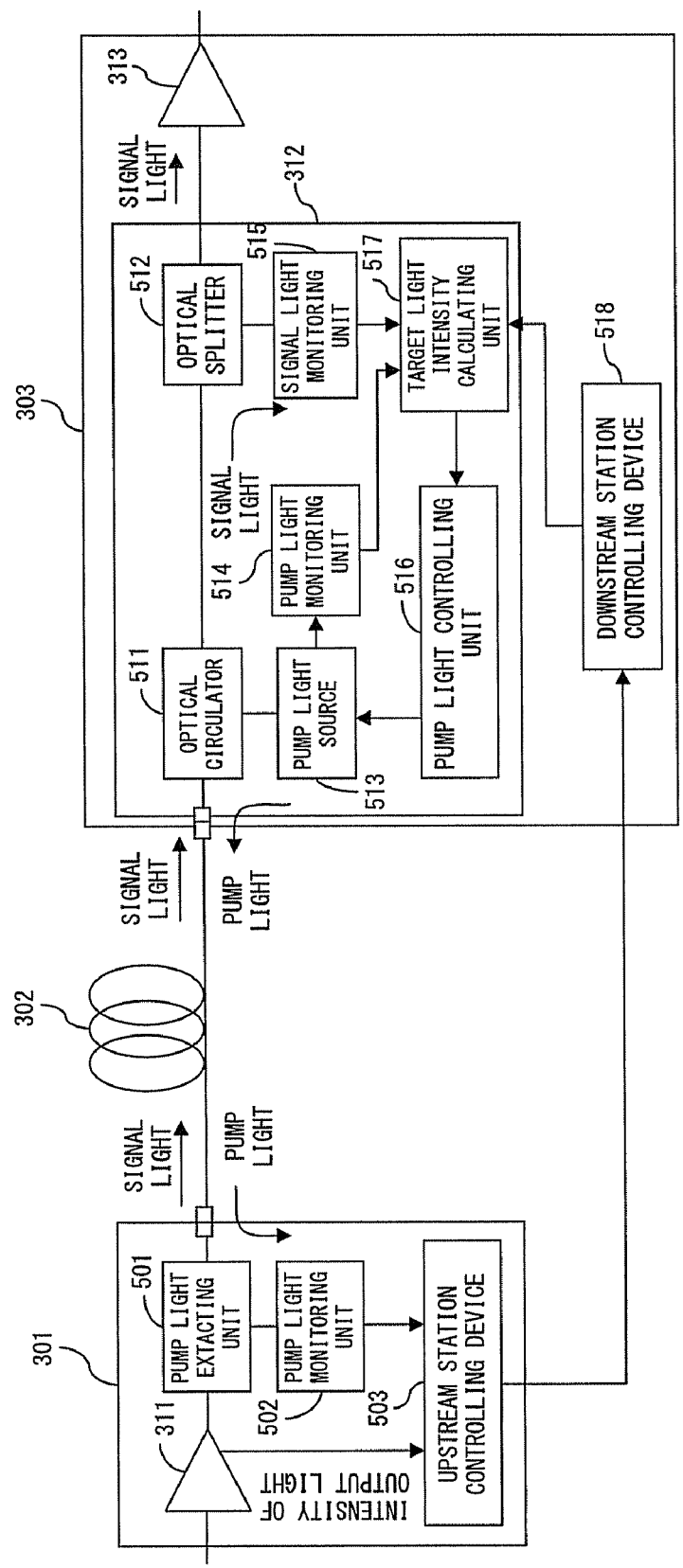
FIG. 5 shows a first configuration of the upstream and the downstream repeater stations.

FIG. 5 shows further details of the configurations of the transmitting devices of the upstream repeater station 301 and the downstream repeater station 303, which are shown in FIG. 3. The upstream repeater station 301 comprises an EDFA 311, a pump light extracting unit 501, a pump light monitoring unit 502, and an upstream station controlling device 503. The downstream repeater station 303 comprises a Raman amplifier 312, an EDFA 313, and a downstream station controlling device 518.

The Raman amplifier 312 of the downstream repeater station 303 includes an optical circulator 511, an optical splitter 512, a pump light source 513, a pump light monitoring unit 514, a signal light monitoring unit 515, a pump light controlling unit 516, and a target light intensity calculating unit 517. The pump light controlling unit 516 and the target light intensity calculating unit 517 are implemented with, for example, an information processing device comprising a CPU (Central Processing Unit) and a memory.

The optical circulator 511 of the Raman amplifier 312 inserts pump light emitted from the pump light source 513 into the transmission line fiber 302, and outputs signal light incident from the transmission line fiber 302 to the optical splitter 512. The optical splitter 512 branches the signal light from the optical circulator 511 into two lights, outputs one of the lights to the signal light monitoring unit 515, and outputs the other to the EDFA 313.

The pump light extracting unit 501 of the upstream repeater station 301 extracts pump light that is output from the downstream repeater station 303 and optically attenuated in the transmission line fiber 302, outputs the extracted pump light to the pump light monitoring unit 502, and emits the signal light amplified by the EDFA 311 to the transmission line fiber 302. As an example here, an optical circulator is used as the pump light extracting unit 501.

The EDFA 311 includes an output light monitoring unit for monitoring the intensity of signal light output to the transmission line fiber 302. The upstream station controlling device 503 transmits monitoring information such as the intensity of signal light, the intensity of pump light, and the like to the downstream station controlling device 518.

Fundamental operations of the units of the Raman amplifier 312 placed in the downstream repeater station 303 are described first.

The pump light source 513 is configured with a light source, such as a laser diode, that generates light having a particular wavelength. With quartz glass used for an optical fiber, a pump light source of a wavelength in accordance with the wavelength of signal light may be configured by utilizing the phenomenon of quartz glass having a maximum amplification characteristic in the wavelength range of a frequency lower, by approximately 13.2 THz, than the wavelength of pump light. Additionally, if signal light in a broad wavelength range is collectively amplified as in a WDM transmission system, a plurality of light sources of different wavelengths may be comprised.

The signal light monitoring unit 515 detects the total amount of the part of the signal light that is branched from the transmission line by the optical splitter 512 and a noise light component mixed therein, and notifies the target light intensity calculating unit 517 of the intensity. Here, the noise light component refers to ASS light that occurs with the Raman amplification effect when light (pump light) of a high intensity is made to be incident to the transmission line fiber 302 by the Raman amplifier 312, and refers to light that includes a component on which noise light occurring in the optical amplifier of the upstream repeater station 301 is superimposed.

The pump light monitoring unit 514 monitors the output intensity of pump light emitted from the pump light source 513 to the transmission line fiber 302. Here, the output intensity of pump light is equivalent to the intensity of light input into the transmission line fiber 302.

The pump light monitoring unit 514 is comprised within the Raman amplifier 312, whereby the pump light output intensity can be obtained with a method for obtaining a correlation between a control signal output by the pump light controlling unit 516 and the intensity of pump light at the input end of the transmission line fiber when the Raman amplifier is manufactured, or with a method for calculating the intensity of pump light at the input end of the transmission line fiber from the intensity of light emitted from the pump light source 513 by using the optical loss of a component that configures the optical circulator 511 or the pump light source 513.

The pump light monitoring unit 514 may monitor pump light at individual wavelengths in accordance with each wavelength given off by the pump light source 513, or may collectively monitor pump light of a plurality of wavelengths of the pump light source 513.

The target light intensity calculating unit 517 calculates, as a target intensity of light, the total of the intensity of signal light required for the Raman amplifier 312, the ASS light generation amount, which is estimated from a Raman gain, and the accumulated noise component of the optical transmission system, which is accumulated by the upstream repeater station. Then, the total amount of the signal light and the noise light component that is detected by the signal light monitoring unit 515 is compared with the calculated target intensity of light.

Among these intensities, the intensity of the accumulated noise component is reported to the Raman amplifier 312 from the upstream repeater station 301 by being superimposed on an optical signal or an electric signal as control information between adjacent repeater stations and transferred between the upstream station controlling device 503 and the downstream station controlling device 518. In contrast, the ASS light generation amount is the intensity of ASS light that occurs with the Raman amplification phenomenon, and a uniform correlation exists, according to the characteristic of the transmission line fiber 302, between a Raman gain, which occurs with the Raman amplification phenomenon, and the ASS light generation amount.

Accordingly, a Raman gain can be calculated from the intensity of signal light required for the Raman amplifier 312, and the ASS light generation amount can be estimated from the Raman gain. Otherwise, the ASS light generation amount can be estimated from a Raman gain required for the Raman amplifier 312.

The target intensity of light Pall_target, which is calculated by the target light intensity calculating unit 517, is the total of Raman-amplified signal light $P_{on}(\lambda_{sig})$, the ASS light generation amount Pass, which occurs in the transmission line fiber 302, and the accumulated noise component Paccum. Therefore, the target intensity of light can be represented by the following equation.

$$\text{Pall\_target} = 10^{\wedge}(P_{on}(\lambda_{sig})/10) + \text{Pass} + \text{Paccum} \quad (1)$$

Equation (1) is an equation represented in a linear unit such as milliwatts. The intensity of signal light $P_{on}(\lambda_{sig})$ is assumed to be represented in a logarithmic unit such as dBm. In equation (1), the intensity of signal light is converted into a linear unit by using the power of 10.

Description is hereinafter provided by assuming that the intensity of signal light is a value represented in the logarithmic unit, unless otherwise noted.

The pump light controlling unit 516 controls the pump light source 513 so that the intensity of pump light, which is monitored by the pump light monitoring unit 514, becomes equal to the target intensity of light calculated by the target light intensity calculating unit 517, in order to obtain a predetermined Raman gain or to optimize the signal to noise ratio characteristic of the optical transmission system. A value based on a target intensity of light input from an external computation unit may be used as the light intensity of a control target for the pump light controlling unit 516 instead of the target intensity of light calculated by the target light intensity calculating unit 517 of the Raman amplifier 312.

Additionally, in a system that requires the flat gain of signal light of a plurality of wavelengths as in a WDM transmission, the Raman amplifier 312 can also control the ratio of the intensities of pump lights $P_{pump1}$ to $P_{pumpm}$ for the respective wavelengths according to the wavelength characteristic of a gain.

Fundamental operations of the units of the upstream repeater station 301 are described next.

The pump light monitoring unit 502 monitors the intensity of pump light that is emitted from the downstream repeater station 303 to the transmission line fiber 302 in reverse to the direction of signal light and reaches the upstream repeater station 301 after being optically attenuated with Rayleigh scattering or the like in the transmission line. The intensity of light at the point where the output end of signal light of the upstream repeater station 301 and the transmission line fiber 302 are connected may be calculated by using the optical loss of the pump light extracting unit 501 in order to monitor the residual intensity of pump light after being optically attenuated in the transmission line fiber 302.

The pump light monitoring unit 502 may monitor pump light at each individual wavelengths in accordance with each wavelength given off by the pump light source 513 of the downstream repeater station 303, or may collectively monitor pump light of a plurality of wavelengths of the pump light source 513.

The output light monitoring unit within the EDFA 311 monitors the intensity of signal light output from the upstream repeater station 301 to the transmission line fiber 302. A method for extracting part of the signal light with an optical splitter and for monitoring the intensity of the signal light output to the transmission line fiber 302, or a method for calculating the intensity of signal light using the intensity of output signal light of a repeater such as the EDFA 311, etc. is used as a monitoring method.

The upstream station controlling device 503 receives the residual pump light, which is monitored by the pump light monitoring unit 502, and the intensity of output signal light, which is monitored by the output light monitoring unit, and transmits these items of information and information about the accumulated noise component of amplified spontaneous emission (ASE) light to the downstream station controlling device 518.

The downstream station controlling device 518 monitors the operational state between adjacent stations, such as the state of the transmission line fiber 302, and the like, on the basis of the information received from the upstream station controlling device 503, and controls the Raman amplifier 312. The downstream station controlling device 518 can also control all or some of the constituent elements of the transmitting device placed in the downstream repeater station 303, including the Raman amplifier 312. Otherwise, the downstream station controlling device 518 may be provided within the Raman amplifier 312, and only the Raman amplifier 312 may be controlled.

Figure 6:
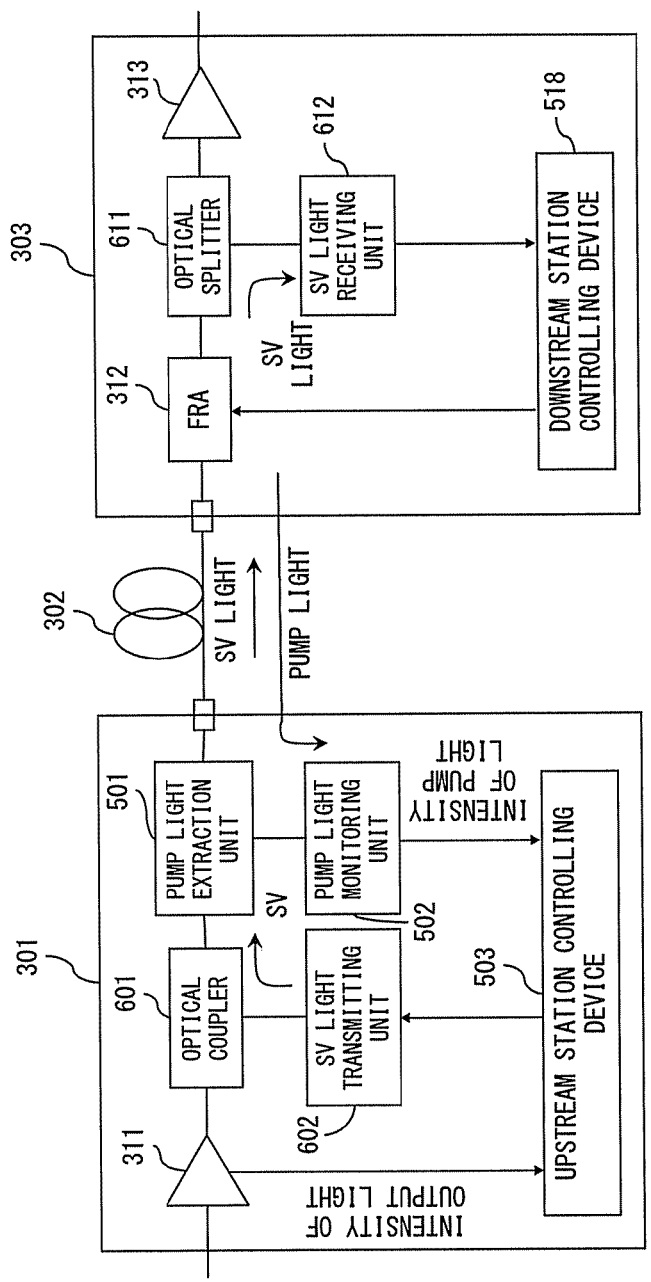
FIG. 6 shows a configuration for transmitting/receiving control information between the upstream and the downstream repeater stations.

FIG. 6 shows an example of a configuration for transmitting/receiving inter-repeater station control information between the upstream station controlling device 503 and the downstream station controlling device 518. In the example shown in FIG. 6, the upstream station controlling device 503 superimposes the inter-repeater station control information on an optical signal called SV (Supervisory) light, and transmits the signal to the downstream station controlling device 518. An optical coupler 601 and an SV light transmitting unit 602 are provided in the upstream repeater station 301 to transmit/receive the SV light, whereas an optical splitter 611 and an SV light receiving unit 612 are provided in the downstream repeater station 303.

The SV light emitted from the upstream repeater station 301 proceeds within the same fiber as the transmission line fiber 302, through which signal light passes, from the upstream repeater station 301 toward the downstream repeater station 303. The pump light monitoring unit 502 and the output light monitoring unit within the EDFA 311 respectively output the residual intensity of pump light and the intensity of output signal light to the upstream station controlling device 503.

Figure 1:
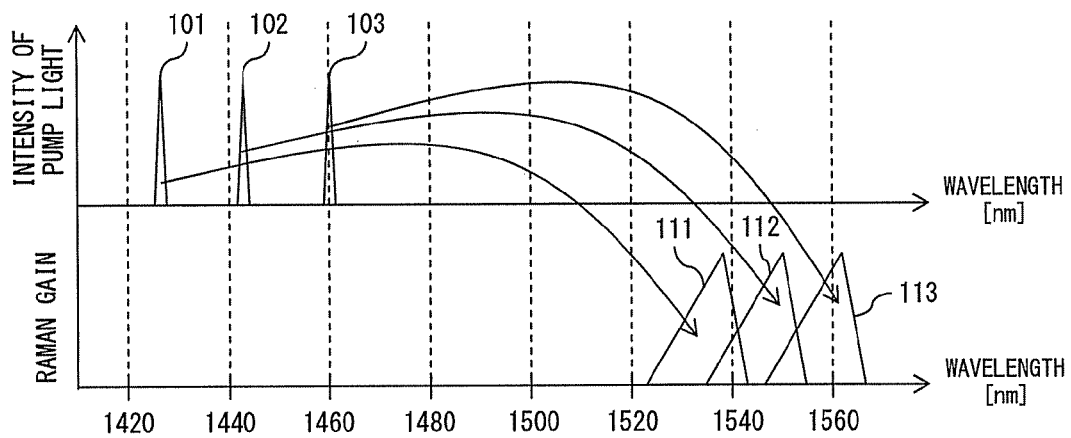
FIG. 1 shows the Raman amplification of a plurality of wavelengths.

The upstream station controlling device 503 outputs the received information to the SV light transmitting unit 602 as inter-repeater station control information, and the SV light transmitting unit 602 outputs the optical signal, on which the inter-repeater station control information is superimposed, as SV light. The output SV light is inserted into the transmission line fiber 302, through which the signal light passes, via the optical coupler 601, and reaches the downstream repeater station 303. A wavelength outside the amplified wavelength range of the Raman amplifier 312 shown in FIG. 1 may be used as the wavelength of the SV light.

The SV light that reaches the downstream repeater station 303 is received by the SV light receiving unit 612 via the optical splitter 611 after passing through the Raman amplifier (FRA) 312. The inter-repeater station control information superimposed on the SV light is transferred from the SV light receiving unit 612 to the Raman amplifier 312 via the downstream controlling device 518.

Next, the method for monitoring the loss of signal light in the transmission line fiber 302 is further described in detail with reference to FIGS. 7 to 9.

As shown in FIG. 4, the pump light emitted from the downstream repeater station 303 to the transmission line fiber 302 is transmitted to the upstream repeater station 301 while its intensity is being lost due to an optical loss in the transmission line. Here, factors causing losses in the intensity of pump light due to the passage of pump light through the transmission line fiber 302 are broadly classified into two classes, absorption loss and scattering loss, excluding structural factors such as local bending of an optical fiber, a connector connection having a discontinuous face, and the like.

For signal light used in an optical transmission system, a wavelength in the near-infrared region in the vicinity of 1550 nm is normally used. Therefore, pump light of a wavelength in the near-infrared region in the vicinity of 1450 nm, which is separate by approximately 13.2 THz, is used. In these wavelength regions, most absorption losses are caused by infrared absorption caused by the molecular vibrations of quartz, which configures an optical fiber. Most of scattering losses are caused by Rayleigh scattering.

The Raman effect that causes the Raman amplification is a phenomenon whereby the intensity of signal light increases due to the occurrence of signal light as Stokes light resulting from the polarization of quartz molecules, which is induced by pump light of a sufficient intensity being confined within an optical fiber. After inducing the polarization, the pump light proceeds within the optical fiber while maintaining its intensity. Accordingly, the loss of the intensity of pump light, which occurs with the Raman amplification, may be ignored.

Figure 7:
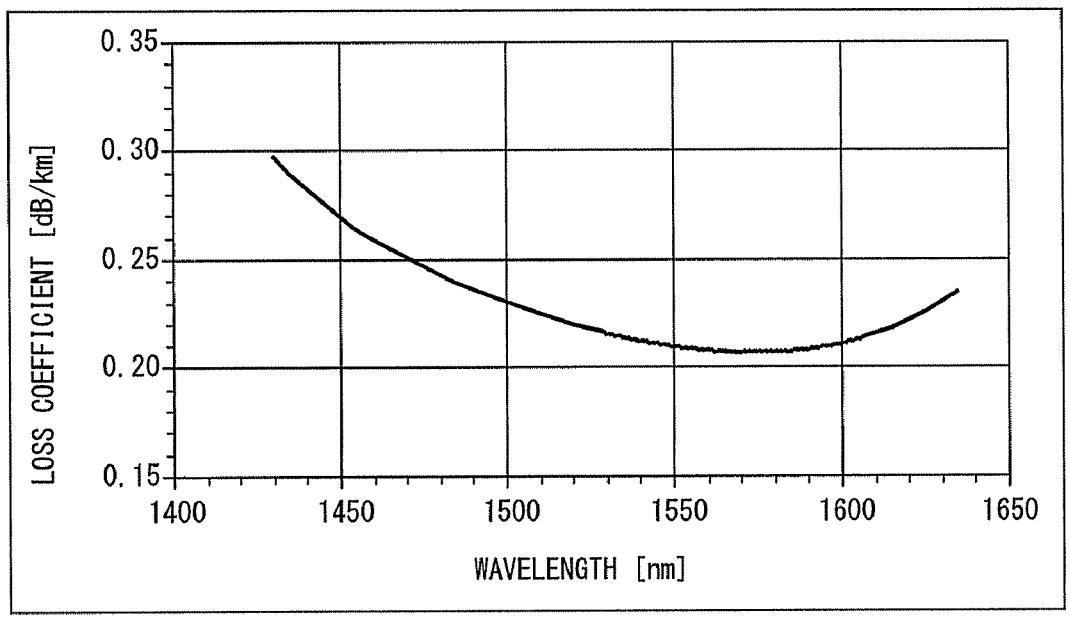
FIG. 7 shows the wavelength characteristic of the loss coefficient of a transmission line fiber.

FIG. 7 shows one example of the wavelength characteristic of the optical loss of a fiber, which is the accumulation of losses of these factors. In FIG. 7, a loss coefficient represents the amount of optical loss of an optical fiber per unit distance. By way of example, for a fiber with an optical loss of 0.2 dB per kilometer, the loss amount is denoted as 0.2 dB/km.

As shown in FIG. 7, the loss characteristic of an optical fiber used for the optical transmission system has its minimum point of the loss coefficient in the vicinity of 1550 nm, and the loss coefficient tends to increase as the loss characteristic moves away from the minimum point to the short or a long wavelength side. The tendency whereby the loss coefficient increases on the short and the long wavelength sides is caused by Rayleigh scattering loss and an infrared absorption loss respectively. Accordingly, the vicinity of 1550 nm, in which the loss coefficient is small, is normally used as the wavelength range of a signal light used for an optical transmission system.

In this example, the loss coefficient of the optical fiber is on the order of 0.21 dB/km with a signal light wavelength in the vicinity of 1550 nm, whereas the loss coefficient is on the order of 0.27 dB/km with a pump light wavelength in the vicinity of 1450 nm, which is used for the Raman amplification for the signal light wavelength.

Figure 8:
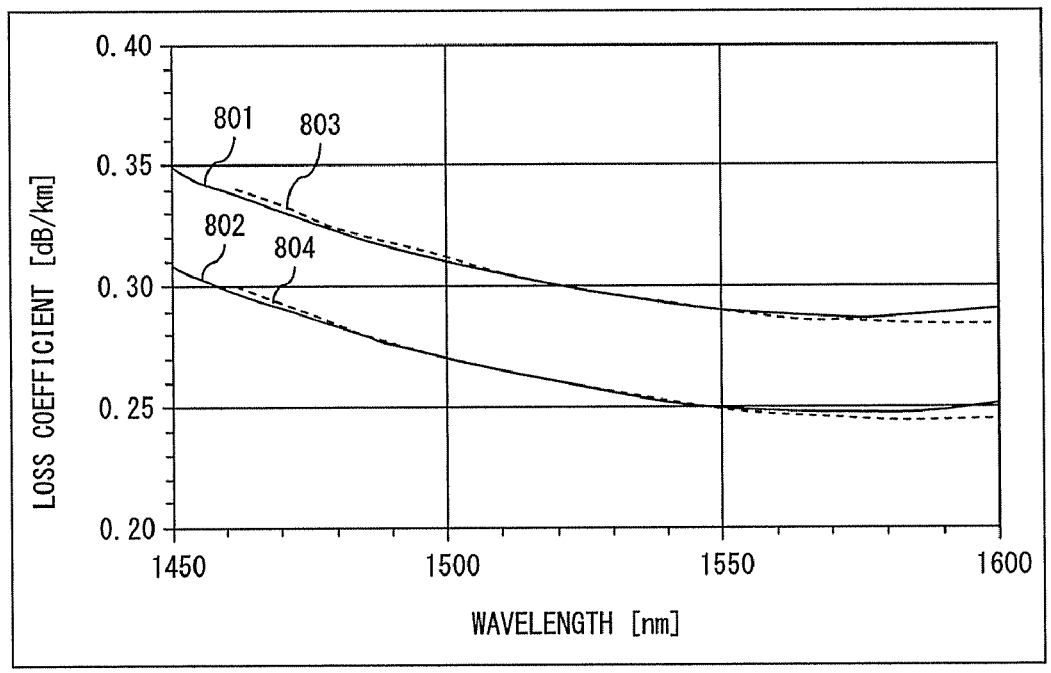
FIG. 8 shows the wavelength characteristics of the loss coefficients of transmission line fibers of different types.

FIG. 8 shows the wavelength characteristics of the loss coefficient to the optical wavelength in a dispersion shift fiber (DSF) and a single mode fiber (SMF). The following is a list of types of fibers having 4 wavelength characteristics represented by solid lines 801 and 802, and broken lines 803 and 804, and loss coefficients of a wavelength of 1550 nm.

801 SMF 0.29 dB/km
802 SMF 0.25 dB/km
803 DSF 0.29 dB/km
804 DSF 0.25 dB/km

If the types of fibers differ, as they do in DSF and SMF, the curve of the wavelength characteristic of a loss coefficient $C_{LOSS}$ to an optical wavelength $\lambda$, namely, the differential coefficient $dC_{LOSS}(\lambda)/d\lambda$, differs. In contrast, for fibers of the same type, their differential coefficient $dC_{LOSS}(\lambda)/d\lambda$ is the same even though their loss coefficients differ in accordance with differences in wavelengths due to differences in manufacturing processes, environmental conditions, etc.

Furthermore, since the wavelength characteristic of a loss coefficient to an optical wavelength is a continuous curve as shown in FIG. 7, the loss coefficient of each wavelength $C_{LOSS}(\lambda)$ can be represented as the function of the optical wavelength $\lambda$. The loss coefficient $C_{LOSS}$ can be represented as an n-degree polynomial for the optical wavelength $\lambda$, by way of example, as in the following equation:

$$C_{LOSS}(\lambda) = a_n \times \lambda^n + a_{n-1} \times \lambda^{n-1} + \ldots + a_2 \times \lambda^2 + a_1 \times \lambda + a_0 \quad (2)$$

where the coefficients $a_1, a_2, \ldots a_{n-1}, a_n$ take values unique to the type of a fiber. Additionally, the differential coefficient $dC_{LOSS}(\lambda)/d\lambda$ of the loss coefficient in equation (2) can be represented by the following equation.

$$dC_{LOSS}(\lambda)/d\lambda = n \times a_n \times \lambda^{n-1} + (n-1) \times a_{n-1} \times \lambda^{n-2} + \ldots + 2a_2 \times \lambda + a_1 \quad (3)$$

Under the condition in which the coefficients $a_1, a_2, \ldots a_{n-1}, a_n$ have the same values and the wavelength is the same, the loss coefficient $C_{LOSS}(\lambda)$ of equation (2) is dependent on a constant term $a_0$, whereas the differential coefficient $da_0/d\lambda$ of equation (3) becomes the same value. This means that the difference between the loss coefficient characteristics of fibers of the same type is represented by the constant term $a_0$ of equation (2).

The loss of signal light in the transmission line fiber 302 between the adjacent repeater stations shown in FIG. 5 can be monitored using the following procedures.

Procedure 1: Assuming that the intensity of signal light, which is monitored by the output light monitoring unit in the upstream repeater station 301 and transmitted to the transmission line fiber 302, is $P_{out}(\lambda_{sig})$, and that of received signal light when the Raman amplifier of the downstream repeater station does not emit pump light is $P_{off}(\lambda_{sig})$, then the loss of signal light LOSS($\lambda_{sig}$) in the transmission line fiber 302 is represented by the following equation.

$$\text{LOSS}(\lambda_{sig}) = P_{out}(\lambda_{sig}) - P_{off}(\lambda_{sig}) \quad (4)$$

Equation (4) is an equation represented in a logarithmic unit such as dBm, and the intensity of each signal light and the optical loss in equation (4) are represented in this logarithmic unit.

The loss of signal light when the Raman amplifier 312 does not emit pump light may be measured, for example, at the time the transmitting device is set up when the Raman amplifier 312 is set up.

If the loss characteristic of the transmission line fiber is invariable regardless of secular changes or changes in the ambient environment (temperature, humidity, etc.), then the loss obtained with equation (4) may be assumed to be the signal light attenuation amount in the transmission line fiber 302. However, a change in the loss characteristic of the transmission line fiber that is caused by these factors is unavoidable in long term operations of the optical communication system.

Since the output of the pump light source 513 of the Raman amplifier 312 is finite, the maximum intensity of pump light that is made to be incident from the Raman amplifier 312 to the transmission line fiber 302, i.e., the maximum value of Raman gain that the Raman amplifier 312 can guarantee, is finite. Therefore, if the Raman amplifier 312 is operated under the condition that signal light level after being Raman-amplified is controlled to be constant, this poses a problem in which the signal light cannot be Raman-amplified to a predetermined signal light level due to the finiteness of a Raman gain when the signal light attenuation amount in the transmission line fiber 302 increases.

The signal light level after being Raman-amplified can impair the signal to noise optical characteristic after being transmitted as described above. Therefore, the ability to monitor changes in the loss characteristic of the transmission line fiber 302 becomes necessary. Monitoring the signal light attenuation amount in the transmission line fiber 302 using equation (4) by temporarily disabling the pump light output of the Raman amplifier 312 has a problem in that the operations of the optical communication system must be halted.

Accordingly, the optical loss is monitored with the following procedures by using the optical loss of pump light used for the Raman amplification in the transmission line fiber 302 and using equation (2) related to the wavelength characteristic of the loss coefficient to the optical wavelength of the transmission line fiber 302, in order to monitor the optical loss of the transmission line fiber 302 while the transmitting device is being operated continuously.

Procedure 2: Assuming that the intensity of pump light that is monitored by the pump light monitoring unit 514 of the downstream repeater station 303 and made incident to the transmission line fiber 302 and the intensity of pump light that is monitored by the pump light monitoring unit 502 of the upstream repeater station 301 and reaches the upstream repeater station 301 are $P2_{pump}$ and $P1_{pump}$, respectively, the optical loss of the wavelength of the pump light LOSS($\lambda_{pump}$) in the transmission line fiber 302 is represented by the following equation.

$$\text{LOSS}(\lambda_{pump}) = P2_{pump} - P1_{pump} \quad (5)$$

Equation (5) is an equation represented in a logarithmic unit, similarly to equation (4), and the intensity of each pump light and the optical loss in equation (5) are represented in this logarithmic unit.

Description is hereinafter provided by assuming that the intensity of pump light and the optical loss take values represented in a logarithmic unit, unless otherwise noted.

Here, Raman scattering loss accompanied by Raman amplification can be ignored as described above. Therefore, absorption loss and Rayleigh scattering loss may be considered alone as the attenuation factors of pump light.

Procedure 3: A difference $C_{LOSS}(\lambda_{pump}) - C_{LOSS}(\lambda_{sig})$ between the loss coefficient of the wavelength of signal light $C_{LOSS}(\lambda_{sig})$ and the loss coefficient of the wavelength of pump light $C_{LOSS}(\lambda_{pump})$ is obtained. With the measurements of procedures 1 and 2, the loss coefficients $C_{LOSS}(\lambda_{sig})$ and $C_{LOSS}(\lambda_{pump})$ cannot be directly obtained. However, $C_{LOSS}(\lambda_{pump}) - C_{LOSS}(\lambda_{sig})$ can be obtained with equation (2) as follows.

$$C_{Loss}(\lambda_{pump}) - C_{Loss}(\lambda_{sig}) = a_n \times (\lambda_{pump}^n - \lambda_{sig}^n) + a_{n-1} \times (\lambda_{pump}^{n-1} - \lambda_{sig}^{n-1}) + \ldots + a_2 \times (\lambda_{pump}^2 - \lambda_{sig}^2) + a_1 \times (\lambda_{pump} - \lambda_{sig}) \quad (6)$$

where the coefficients $a_1, a_2, \ldots, a_{n-1}, a_n$, the wavelength of signal light $\lambda_{sig}$, and the wavelength of pump light $\lambda_{pump}$ are known information. Therefore, $C_{LOSS}(\lambda_{pump}) - C_{LOSS}(\lambda_{sig})$ can be obtained even if the values of $C_{LOSS}(\lambda_{sig})$ and $C_{LOSS}(\lambda_{pump})$ are unknown.

Procedure 4: The distance of the transmission line fiber 302 between the adjacent repeater stations is obtained from the transmission line losses of the wavelengths of signal light and pump light, which are obtained with procedures 1 and 2, and the difference between the loss coefficients $C_{LOSS}(\lambda_{pump}) - C_{LOSS}(\lambda_{sig})$, which is obtained with procedure 3. The optical loss LOSS($\lambda$) of the optical wavelength $\lambda$ of the transmission line fiber 302 between the adjacent repeater stations is represented by the following equation based on the assumption that the distance between the repeater stations (the length of the transmission line fiber) is L.

$$\text{LOSS}(\lambda) = C_{LOSS}(\lambda) \times L + X \quad (7)$$

Equation (7) is an equation represented in a logarithmic unit. For example, the loss coefficient $C_{LOSS}(\lambda)$, the transmission line fiber length L, and the local optical loss X in equation (7) are represented in the units of dB/km, km, and dB respectively.

The last term X in equation (7) represents a local optical loss such as a connector connection, a bending loss, etc. in a repeater station, etc. This local optical loss X is a constant amount irrespective of optical wavelength. The length of the transmission line fiber L is obtained as follows by applying the transmission line losses LOSS($\lambda_{sig}$) and LOSS($\lambda_{pump}$) of the wavelengths of signal light and pump light, which are obtained with the above described procedures, to equation (7).

$$L = (\text{LOSS}(\lambda_{pump}) - \text{LOSS}(\lambda_{sig}))/(C_{LOSS}(\lambda_{pump}) - C_{LOSS}(\lambda_{sig}))  \quad (8)$$

Procedure 5: The optical loss LOSS($\lambda$) of the transmission line fiber 302 in which the Raman amplifier 312 is placed is represented with the optical wavelength $\lambda$. The optical loss LOSS($\lambda_{pump}$) can be represented as follows by expanding equation (7) with the use of equation (2).

$$\begin{aligned}\text{LOSS}(\lambda) &= (a_n \times \lambda^n + a_{n-1} \times \lambda^{n-1} + \ldots + a_2 \times \\ &\quad \lambda^2 + a_1 \times \lambda + a_0) \times L + X \\ &= A_n \times \lambda^n + A_{n-1} \times \lambda^{n-1} + \ldots + A_2 \times \lambda^2 + A_1 \times \lambda + A_0 \end{aligned} \quad (9)$$

where the coefficients $A_n, A_{n-1}, \ldots, A_2, A_1, A_0$ are respectively defined by $A_n = a_n \times L$, $A_{n-1} = a_{n-1} \times L$, ..., $A_2 = a_2 \times L$, $A_1 = a_1 \times L$, $A_0 = a_0 \times L + X$. Since the coefficients $a_1, a_2, \ldots, a_{n-1}, a_n$, which are unique to the type of fiber, and the transmission line fiber length L are values that are unique to the transmission line fiber 302 and are known, the coefficients $A_n$, $A_{n-1}, \ldots, A_2, A_1$ can be obtained. Because the wavelength of pump light $\lambda_{pump}$ and the transmission line loss LOSS($\lambda_{pump}$) are also known, the constant term $A_0$ can be obtained with the following equation.

$$A_0 = \text{LOSS}(\lambda_{pump}) - \begin{pmatrix} A_n \times \lambda_{pump}^n + A_{n-1} \times \lambda_{pump}^{n-1} + \ldots + \\ A_2 \times \lambda_{pump}^2 + A_1 \times \lambda_{pump} \end{pmatrix} \quad (10)$$

The optical loss LOSS($\lambda$) of the transmission line fiber 302 can be represented with the optical wavelength $\lambda$ by applying all of the coefficients $A_n, A_{n-1}, \ldots, A_2, A_1, A_0$, which are determined with the above described procedures, to equation (9).

Procedure 6: A change in the loss characteristic of the transmission line fiber 302 is monitored while the transmitting device in each repeater station is being operated. The coefficients $a_1, a_2, \ldots, a_{n-1}, a_n$, which are unique to the type of fiber, and the transmission line fiber length L are invariable values even if the characteristic of the transmission line fiber 302 varies. Accordingly, the coefficients $A_1, A_2, \ldots, A_{n-1}, A_n$ in equation (9) are fixed values unique to the transmission line fiber 302.

Initially, the loss of pump light LOSS($\lambda_{pump}$) in the transmission line fiber 302 is monitored with procedure 2 while the transmitting device is being operated continuously. Next, the constant term $A_0$ is obtained by applying the monitored loss of pump light LOSS($\lambda_{pump}$) to equation (10). The constant term $A_0 = a_0 \times L + X$ is a value that changes with a local optical loss X, which varies with secular changes or environmental condition changes, and with changes in the loss coefficient. A change in the loss characteristic of the transmission line fiber 302 can be represented as the constant term $A_0$.

Procedure 7: The optical loss LOSS($\lambda_{sig}$) of the transmission line fiber 302 in the signal light wavelength $\lambda_{sig}$ can be obtained by applying the constant term $A_0$ that is obtained with procedure 6 and varies with changes in the characteristic of the transmission line fiber 302, to equation (9).

Figure 9:
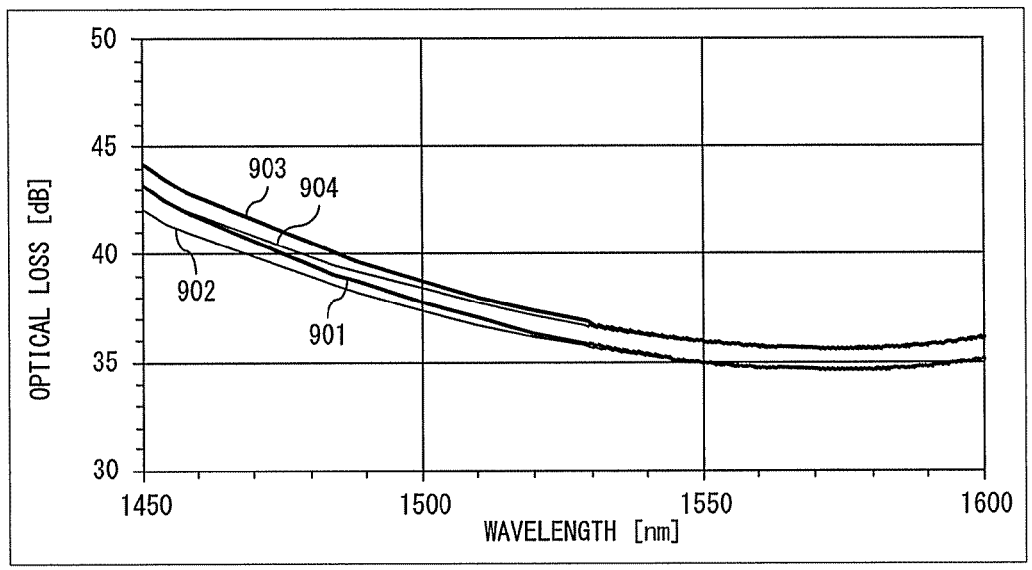
FIG. 9 shows a change in the wavelength characteristic of an optical loss that occurs with a change in the optical characteristic of a transmission line fiber.

FIG. 9 shows the optical loss characteristic to optical wavelength of two different transmission lines A and B, for which fibers of the same type are used. Here, assume that a transmission line fiber having $a_{0A}$ as the constant term of equation (2), which represent a loss coefficient, transmission line fiber length $L_A$, and local optical loss $X_A$ is used as the transmission line A, whereas a transmission line fiber having $a_{0B}$ as the constant term of equation (2), transmission line fiber length $L_B$, and local optical loss $X_B$ is used as the transmission line B.

Curves 901 and 902 represent the wavelength characteristics of transmission lines A and B before the change in their characteristics, whereas curves 903 and 904 represent the wavelength characteristics of transmission lines A and B after the change in their characteristics.

Since transmission lines A and B are fibers of the same type, coefficients $a_1, a_2, \ldots, a_{n-1}, a_n$ in equation (2) have the same values. Accordingly, the difference between the wavelength characteristics of transmission lines A and B in FIG. 9 results from the differences of the constant term $A_0$ in equation (9) and the coefficients $A_1, A_2, \ldots, A_{n-1}, A_n$, which are obtained by multiplying the coefficients $a_1, a_2, \ldots, a_{n-1}, a_n$ by the transmission line fiber length; i.e., from $d\text{LOSS}(\lambda)/d\lambda$, which is the differential coefficient of the expression of the optical loss LOSS($\lambda$) with respect to the optical wavelength $\lambda$.

A change in the loss characteristic of a transmission line fiber that occurs with a secular change or an environmental condition change is represented as a change in the constant term $A_0$. However, the differential coefficient $d\text{LOSS}(\lambda)/d\lambda$ is invariable. Accordingly, the difference between the transmission line losses of pump light and signal light $\Delta\text{LOSS} = \text{LOSS}(\lambda_{pump}) - \text{LOSS}(\lambda_{sig})$, which is measured at the time of setup of the transmitting device, is constant regardless of changes in the characteristic of the transmission line fiber. Therefore, the transmission line loss of the wavelength of signal light LOSS($\lambda_{sig}$) can be obtained with the following equation by using $\Delta\text{LOSS}$ and also LOSS($\lambda_{pump}$), which is measured continuously during the continuous operations of the transmitting device.

$$\text{LOSS}(\lambda_{sig}) = \text{LOSS}(\lambda_{pump}) - \Delta\text{LOSS} \quad (11)$$

With the above described procedures 3 and those that come after, the difference between the loss coefficients of the wavelengths of pump light and signal light in the transmission line fiber 302 is calculated in addition to the transmission line loss of the pump light, which is monitored continuously, in order to monitor the transmission line loss of the wavelength of signal light while the transmitting device is being operated continuously. However, the difference between the loss of signal light LOSS($\lambda_{sig}$), which is measured with procedure 1, in a state in which the pump light is halted, and the optical loss of the wavelength of pump light LOSS($\lambda_{pump}$), which is measured pursuant to procedure 2 at the time of setup of the transmitting device, may be stored as $\Delta\text{LOSS}$, and the optical loss of the wavelength of signal light may be estimated from the transmission line loss of pump light, which is continuously monitored with procedure 2, pursuant to equation (11).

Additionally, a plurality of types of coefficients and functions may be prepared as the coefficients and the functions used in the calculation formulas in the above described procedures in correspondence with transmission line fibers of different types, and the prepared coefficients and functions may be used in accordance with the transmission line fiber that will actually be used.

As described above, in the optical transmission system according to this preferred embodiment, both the intensity of pump light that is caused to be incident from the Raman amplifier 312 to the transmission line fiber 302 for the Raman amplification and the residual intensity of the pump light that traces back through the transmission line and reaches the upstream repeater station 301 are monitored to observe the transmission line loss of the transmission line fiber 302. Then, the optical loss of the transmission line fiber 302 in the wavelength of signal light, which varies with secular/environmental changes, can be monitored continuously by using the transmission line loss of signal light, which is measured at the time of setup of the transmitting device, the transmission line loss of pump light, which is monitored continuously while the transmitting device is being operated continuously, and the above described procedures.

Furthermore, by continuously monitoring changes in the loss characteristic of the fiber, an abnormality such as an excessive optical loss of the transmission line which might deteriorate the signal to noise optical characteristic of the transmitting device in the case that a Raman gain is finite due to the limitations of the output of the pump light source 513, or the disconnection of the transmission line fiber 302 can be detected.

A method for accurately estimating the generation intensity of ASS light that occurs with the Raman amplification from the optical loss of the transmission line fiber 302, which is continuously monitored, and from the Raman gain required for the Raman amplifier 312, and for accurately controlling the Raman gain or the intensity of signal light after being Raman-amplified is described next.

As shown in FIG. 4, the signal light proceeds to the downstream repeater station 303 while being attenuated due to loss factors as the signal passes through the transmission line fiber 302. As the signal light approaches the downstream repeater station 303, it is Raman-amplified by pump light that is made incident from the Raman amplifier 312 to the transmission line fiber 302, and the intensity of the signal light increases. With the Raman amplification using the Raman effect, ASS light occurs as a noise component in the same direction as the signal light.

Figure 10:
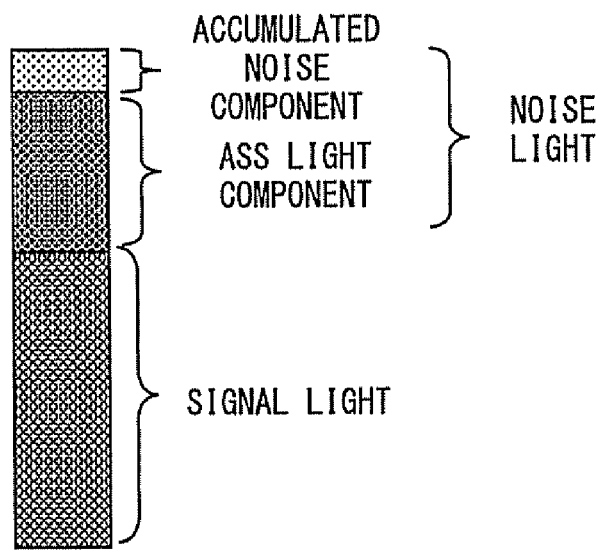
FIG. 10 shows the breakdown of the intensities of all of the light that reaches a Raman amplifier.

Also a noise component (such as ASE light occurring in the EDFA) that is accumulated until it reaches the downstream repeater station 303 and that occurs in the optical amplifier of the upstream repeater station 301, etc., coexists with the ASS light. Accordingly, the Raman-amplified signal light $P_{on}(\lambda_{sig})$, the ASS light generation amount Pass, and the accumulated noise component Paccum, such as ASE light, etc., coexist in the intensity of light Pall_obs, which reaches the signal light monitoring unit 515 within the Raman amplifier 312 after being Raman-amplified, as shown in FIG. 10. Therefore, Pall_obs is represented by the following equation, which is a transformation from equation (1):

$$\text{Pall\_obs} = 10^{\wedge}(P_{on}(\lambda_{sig})/10) + \text{Pass} + \text{Paccum} \quad (12)$$

where the ASS light generation amount Pass is calculated by the target light intensity calculating unit 517 within the Raman amplifier 312.

With the conventional technique, Pass is estimated pursuant to the relational expression between the light intensities of wavelengths $P_{pump1}$ to $P_{pumpm}$ of the pump light source, which are made incident to the transmission line, and the ASS light generation amount Pass as represented by the following equation.

$$\text{Pass} = \text{ASSpump}(P_{pump1}, P_{pump2}, \ldots, P_{pumpm}) \quad (13)$$

An accumulated noise component accumulated from the transmitting end station to the upstream repeater station 301 is reported from the upstream station controlling device 503 as the accumulated noise component Paccum of ASE light, etc.

In the meantime, for a Raman amplifier used in a long-distance transmission system, the ability to accurately Raman-amplify the intensity of signal light is required so that the signal to noise light characteristic of the transmitting device becomes optimum. Accordingly, the ability to monitor an accurate Raman gain and the intensity of signal light after being Raman-amplified is required for the Raman amplifier 312.

Pall_obs in equation (12) is a value that can be obtained by being measured with the signal light monitoring unit 515. Since Paccum is a value reported from the upstream repeater station 301, the value of $P_{on}(\lambda_{sig})$+Pass can be calculated pursuant to (12). In contrast, the correlation between the intensity of pump light that is made incident to the transmission line and the ASS light generation amount is significantly influenced by the optical characteristic of the transmission line fiber 302 as described above. Therefore, the ASS light generation amount Pass relative to the optical characteristic of every transmission line fiber cannot be estimated with a high accuracy on the basis of only the information about the intensity of pump light made incident from the Raman amplifier 312 to the transmission line fiber 302, that is obtained by the pump light monitoring unit 514.

Therefore, the ASS light generation amount Pass is estimated by using the Raman gain $G_R$ with the following procedures, and the intensity of pump light emitted from the pump light source 513 is controlled so that the intensity of signal light $P_{on}(\lambda_{sig})$ after being Raman-amplified becomes a predetermined intensity.

Procedure 1: The loss of signal light LOSS($\lambda_{sig}$) in the transmission line fiber 302 is measured pursuant to equation (4) when the pump light of the Raman amplifier 312 is not output, similarly to procedure 1 of the above described monitoring method. The loss of signal light is measured, for example, at the time the transmitting device is set up when the Raman amplifier 312 is set up.

Procedure 2: Pump light is made to be incident from the pump light source 513 of the Raman amplifier 312 to the transmission line fiber 302 in a state in which signal light passes through the transmission line fiber 302, and the intensity of the pump light is controlled so that the intensity of the signal light, or the total intensity of all of the lights including the ASS light generation amount and the accumulated noise component, reaches a predetermined value.

Procedure 3: The ASS light generation amount arrives at almost the same intensity regardless of the optical characteristic of the transmission line fiber that serves as an amplification medium, under the condition that the gain of the Raman amplifier 312 is constant. By using this characteristic, the ASS light generation amount Pass can be estimated with a higher accuracy from an approximate expression related to the Raman gain $G_R$.

The ASS light generation amount that is estimated only from the intensity of pump light and the ASS light generation amount that actually occurs when the Raman amplifier is operated with a Raman gain of 10 dB for DSF fibers having various optical characteristics are both shown in FIG. 11 for a comparison with the conventional technique. In FIG. 11, bar graph 1101 represents the generation amount of actual ASS light, whereas bar graph 1102 represents the result of estimation of the ASS light generation amount according to the conventional technique.

The correlation between the intensity of pump light of an optical fiber having a certain optical characteristic and the ASS light generation amount is used to estimate the ASS light generation amount using only the intensity of pump light. Here, the correlation is derived by assuming that the local loss of the repeater station where the Raman amplifier is placed, the type of the transmission line fiber, and the loss coefficient are 0.5 dB, DSF, and 0.25 dB/km, respectively.

In contrast, the loss coefficient of each fiber used for the comparison is different, in the range from 0.21 dB/km to 0.29 dB/km in increments of 0.01 dB/km, although its type is also DSF.

In addition, required intensities of pump light when the Raman amplifier is operated with a Raman gain of 10 dB for DSF fibers having various optical characteristics are shown in FIG. 12. As shown in FIG. 12, the intensity of pump light that is required to obtain a predetermined Raman gain depends on the largeness/smallness of the loss coefficient of an optical fiber. A fiber for which the loss coefficient is larger requires a higher intensity of pump light. Additionally, for fibers having the same optical characteristic, the Raman effect normally becomes higher as the intensity of pump light increases. Therefore, the ASS light generation amount has a monotonically increasing relationship with the intensity of pump light.

Accordingly, if the estimation method that uses a fiber having a certain optical characteristic as a reference is applied to optical fibers having various optical characteristics, a large error occurs in the estimation of the ASS light generation amount as shown in FIG. 11, leading to a problem whereby the intensity of signal light and a Raman gain cannot be accurately controlled.

In the meantime, if the Raman amplifier is operated with a predetermined Raman gain using fibers having various optical characteristics as amplification media, almost the same amount of ASS light occurs regardless of the intensity of pump light and the optical characteristic of an optical fiber, as shown in FIG. 11.

Figure 13:
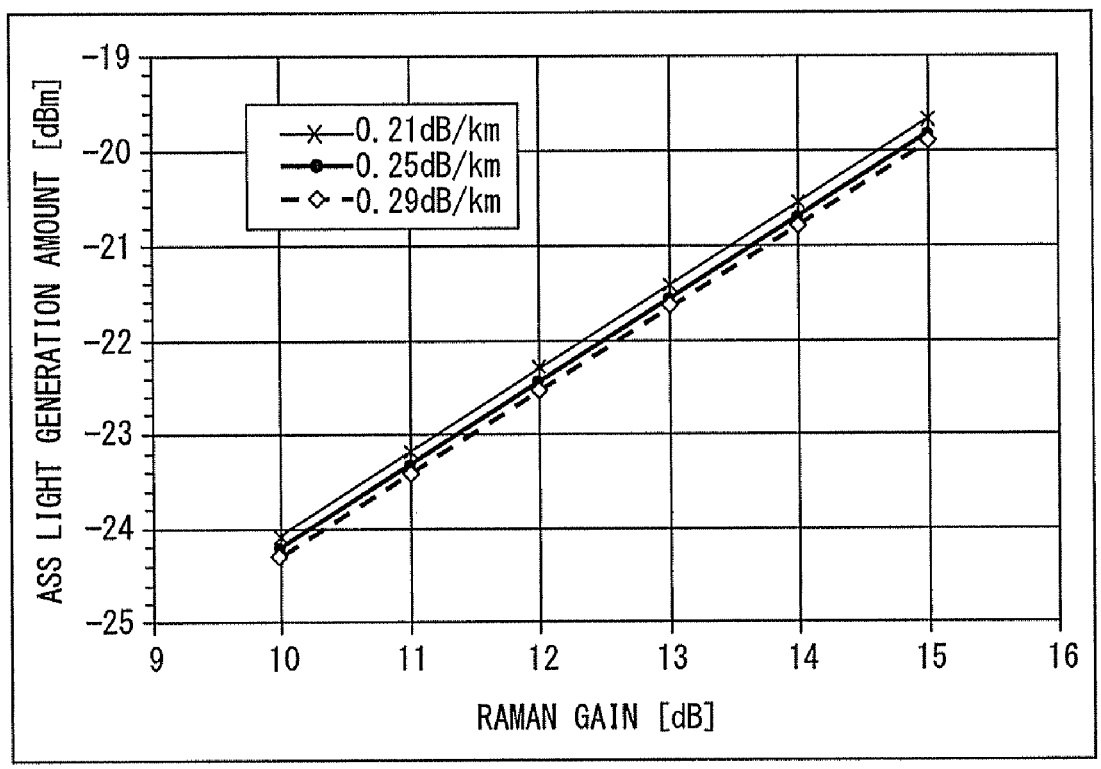
FIG. 13 shows a correlation between a Raman gain and the ASS light generation amount.

The ASS light generation amounts when the Raman amplifier is operated with various Raman gains for optical fibers that are of the same type and have various optical characteristics are shown in FIG. 13. FIG. 13 shows that the ASS light generation amount is not influenced by the optical characteristic of a transmission line fiber, which serves as an amplification medium, under the condition that the gain of the Raman amplifier is constant. Procedure 3 described above is intended to estimate the ASS light generation amount Pass from the Raman gain $G_R$ by using the relationship, which is shown in FIG. 13, between the Raman gain and the ASS light generation amount.

Here, assume that the ASS light generation amount Pass is represented as a function related to the Raman gain $G_R$ with the following equation.

$$\text{Pass} = \text{ASSgain}(G_R) \quad (14)$$

Pursuant to equation (14), the ASS light generation amount Pass, which occurs with the Raman effect, can be estimated when the Raman amplifier 312 is controlled with the Raman gain $G_R$.

Additionally, if the Raman amplifier 312 is controlled so that the intensity of signal light after being Raman-amplified reaches $P_{on}(\lambda_{sig})$, the Raman gain $G_R$ required to estimate the ASS light generation amount is obtained with equations (15) and (16) following. The intensity of signal light $P_{off}(\lambda_{sig})$ when the Raman amplification is not made, namely, in a state in which pump light is not emitted from the Raman amplifier 312 to the transmission line fiber, can be obtained, by using equation (15), from the transmission line loss of signal light $\text{LOSS}(\lambda_{sig})$, which is calculated with equation (11), and the intensity of output signal light $P_{out}(\lambda_{sig})$, which is monitored by the output light monitoring unit.

$$P_{off}(\lambda_{sig}) = P_{out}(\lambda_{sig}) - \text{LOSS}(\lambda_{sig}) \quad (15)$$

If the intensity of signal light after being Raman-amplified is $P_{on}(\lambda_{sig})$, the required Raman gain $G_R$ is represented by the following equation.

$$G_R = P_{on}(\lambda_{sig}) - P_{off}(\lambda_{sig}) \quad (16)$$

Equation (16) is an equation represented in a logarithmic unit. Description is hereinafter provided by assuming that the Raman gain is a value represented in this logarithmic unit, unless otherwise noted.

The ASS light generation amount Pass at the time of operations performed with the Raman gain $G_R$ can be estimated by applying the Raman gain $G_R$, which is obtained with equation (16), to equation (14).

Procedure 4: To obtain a desired gain $G_R$ or a desired intensity of signal light $P_{on}(\lambda_{sig})$, the intensity of pump light is controlled so that the intensity of all of the lights Pall_obs, which is monitored by the signal light monitoring unit 515, becomes a predetermined intensity.

If the control target of the Raman amplifier 312 is to reach the Raman gain $G_R$, the ASS light generation amount Pass is represented by a mathematical expression that uses the Raman gain $G_R$ as a variable, as shown in FIG. 13 or in equation (14). The intensity of signal light $P_{on}(\lambda_{sig})$ that is Raman-amplified with the Raman gain $G_R$ is represented by $P_{on}(\lambda_{sig}) = P_{off}(\lambda_{sig}) \times G_R$. Accordingly, the intensity of all of the lights Pall_target with which a desired gain $G_R$ is reached is obtained by the following equation transformed from equation (1).

$$\begin{aligned}\text{Pall\_target} &= 10^{\wedge}(P_{on}(\lambda_{sig})/10) + \text{ASSgain}(G_R) + \text{Paccum} \quad (17)\\ &= 10^{\wedge}((P_{off}(\lambda_{sig}) + G_R)/10) + \text{ASSgain}(G_R) + \\ &\quad \text{Paccum}\end{aligned}$$

By using equation (17), the intensity of all of the lights that must be reached at the signal light monitoring unit 515 when a control is performed so that the Raman amplifier 312 reaches a desired gain $G_R$ or a desired intensity of signal light $P_{on}(\lambda_{sig})$, is obtained. The pump light controlling unit 516 may control the intensity of pump light until the intensity of all of the lights Pall_obs becomes equivalent to the target intensity of the light Pall_target obtained with equation (17). If the intensity of all of the lights Pall_obs reaches the target intensity of the light Pall_target, this means that the Raman amplifier 312 reaches the desired Raman gain or the desired intensity of signal light.

Additionally, Pall_target, Paccum, and $P_{off}(\lambda_{sig})$ in equation (17) are obtained by the signal light monitoring unit 515, the upstream station controlling device 503, and equation (15), respectively. Therefore, equation (17) is represented as the relational expression of one variable related to $G_R$. Accordingly, the Raman gain $G_R$ can be obtained by solving equation (17). The intensity of pump light may be controlled so that the Raman gain $G_R$ obtained by solving equation (17) reaches a gain level required for the Raman amplifier 312.

Even if the intensity of pump light is controlled pursuant to procedure 4, a desired Raman gain or a desired intensity of signal light is not reached in some cases. For example, if the optical loss of the transmission line fiber 302 is large, or if a fiber having a low degree of the Raman amplification effect with Raman scattering is used as an amplification medium, a sufficient Raman gain or a high intensity of signal light after being Raman-amplified cannot be obtained due to the finiteness of the intensity of pump light emitted from the pump light source 513. In this case, the intensity of all of the lights Pall_target, which is calculated from a required Raman gain or a required intensity of signal light, cannot be reached.

Accordingly, the processes of procedures 5 and beyond are executed subsequently to procedure 4 if the intensity of pump light reaches the upper limit.

Procedure 5: A Raman gain when the intensity of pump light of the Raman amplifier 312 reaches the upper limit is obtained.

Assuming that the intensity of all of the lights, which is monitored by the signal light monitoring unit 515, and the Raman gain when the intensity of pump light reaches the upper limit, are Pall(Limit) and $G_R$(Limit), respectively, equation (17) can be replaced with the following equation.

$$\text{Pall(Limit)} = 10^{\wedge}(P_{on}(\lambda_{sig})/10) + ASSgain(G_R(\text{Limit})) + \quad (18)$$
$$Paccum$$
$$= 10^{\wedge}((P_{off}(\lambda_{sig}) + G_R(\text{Limit}))/10 +$$
$$ASSgain(G_R(\text{Limit})) + Paccum$$

Since equation (18) is represented as a relational expression of one variable related to the Raman gain $G_R$(Limit), the Raman gain $G_R$(Limit) is obtained by solving equation (18).

Procedure 6: If the Raman gain or the intensity of signal light when the intensity of pump light reaches the upper limit does not reach a value that the transmitting device expects from the Raman amplifier 312, the downstream station controlling device 518 is notified of the information that the Raman gain or the intensity of signal light is insufficient.

The downstream station controlling device 518 may issue a warning based on the information that the Raman gain or the intensity of signal light of the Raman amplifier 312 is insufficient if the insufficiency affects the communication quality of the transmitting device. Or, if the insufficiency does not affect the communication quality of the transmitting device, the Raman gain $G_R$(Limit) is set as the gain of the Raman amplifier 312, and a notification that the transmitting device is in a normal condition may be made to a higher-order controlling device that monitors all of transmitting devices.

Additionally, a plurality of types of coefficients and functions may be prepared as the coefficients and the functions used in the calculation expressions in the above described procedures in correspondence with transmission line fibers of different types, and the prepared coefficients and functions may be used in accordance with the transmission line fiber that will actually be used.

Here, one example of the processes executed by the pump light controlling unit 516 and the target light intensity calculating unit 517 in the above described controlling method is described below.

Figure 14:
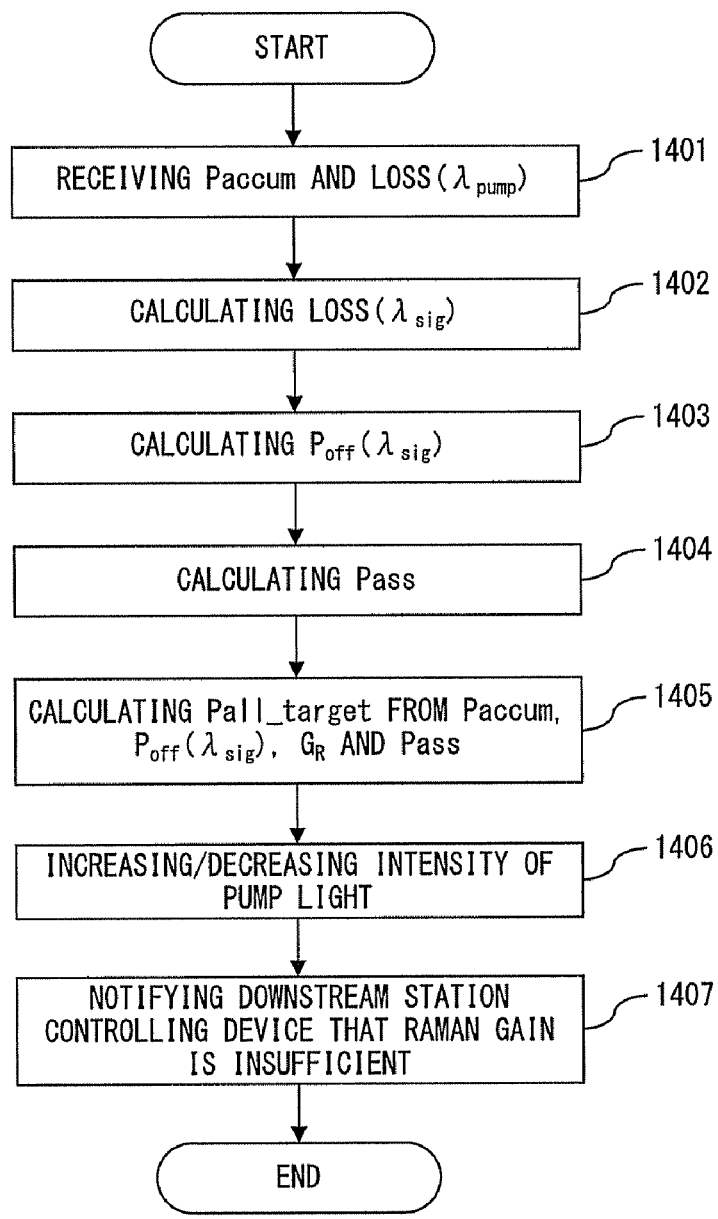
FIG. 14 is a flowchart showing a process executed when a required Raman gain is given.

FIG. 14 is a flowchart showing the process executed when a required Raman gain $G_R$ is given to the Raman amplifier 312.

Upon receipt of the accumulated noise component Paccum and the loss of pump light LOSS($\lambda_{pump}$) from the downstream station controlling device 518 (step 1401), the target light intensity calculating unit 517 calculates the transmission line loss of the wavelength of signal light LOSS($\lambda_{sig}$) pursuant to equation (11) (step 1402). Next, the target light intensity calculating unit 517 calculates the intensity of signal light $P_{off}(\lambda_{sig})$ in a state in which the Raman gain is 0 pursuant to equation (15) (step 1403), and also calculates the ASS light generation amount Pass pursuant to equation (14) by using the required Raman gain $G_R$ (step 1404). Then, the target light intensity calculating unit 17 calculates the intensity of target light Pall_target of the Raman amplifier 312 from Paccum, $P_{off}(\lambda_{sig})$, $G_R$, and Pass (step 1405).

The pump light controlling unit 516 increases/decreases the intensity of pump light until the intensity of all of the lights Pall_obs that is received from the signal light monitoring unit 515 reaches the target light intensity Pall_target (step 1406). If Pall_obs does not reach the target light intensity Pall_target even if the intensity of pump light is set to a maximum value, the downstream station controlling device 518 is notified of the information that the Raman gain is insufficient from the required gain $G_R$.

Figure 15:
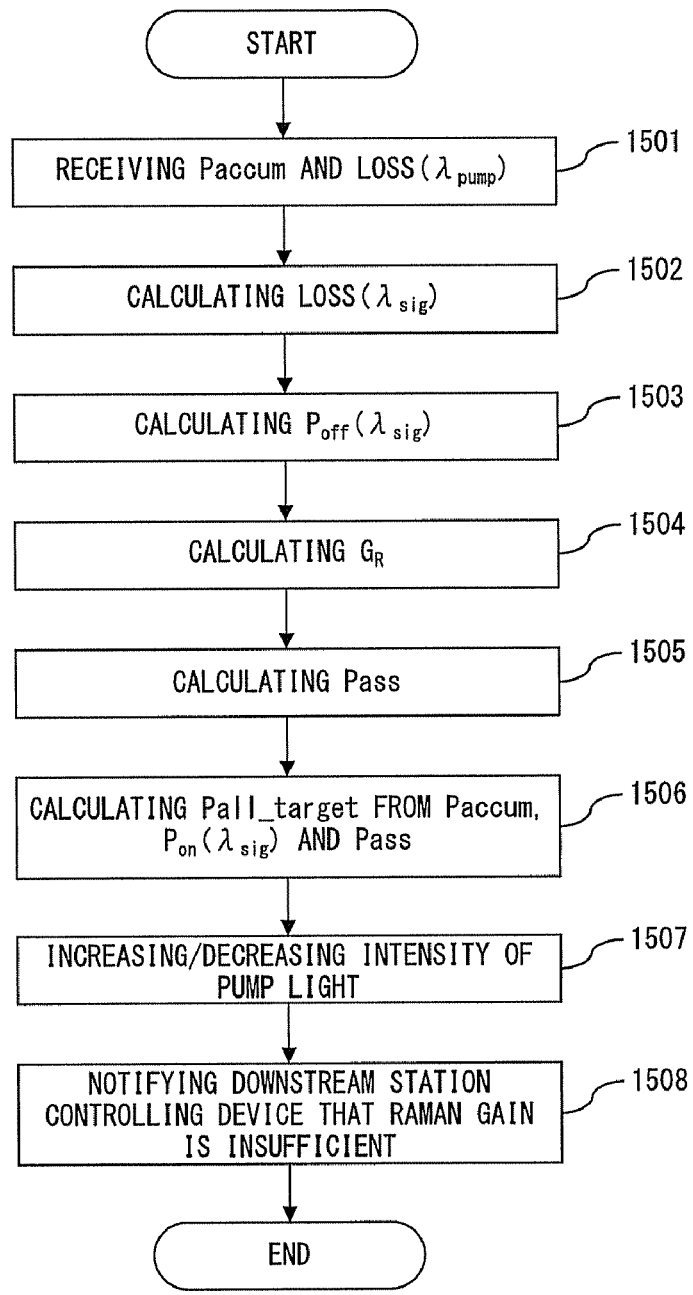
FIG. 15 is a flowchart showing a process executed when a required signal light intensity is given.

FIG. 15 is a flowchart showing the process executed when a required $P_{on}(\lambda_{sig})$ is given to the Raman amplifier 312. In FIG. 15, operations in steps 1501 to 1503 and 1507 are similar to those in steps 1401 to 1403 and 1406 of FIG. 14.

When the intensity of signal light $P_{off}(\lambda_{sig})$ in the state where the Raman gain is 0 is calculated in step 1503, the target light intensity calculating unit 517 calculates the Raman gain $G_R$ needed to obtain the required intensity of signal light $P_{on}(\lambda_{sig})$ pursuant to equation (16) (step 1504). Next, the target light intensity calculating unit 517 calculates the ASS light generation amount Pass pursuant to equation (14) by using the obtained Raman gain $G_R$ (step 1505). Then, the target light intensity calculating unit 517 calculates the target light intensity Pall_target of the Raman amplifier 312 from Paccum, $P_{on}(\lambda_{sig})$, and Pass pursuant to equation (17) (step 1506).

If the target light intensity Pall_target is not reached even if the intensity of pump light is set to a maximum value in step 1507, the pump light controlling unit 516 notifies the downstream station controlling device 518 that the intensity of signal light is insufficient.

Here, a comparison is made between the estimation accuracies of the ASS light generation amounts according to a conventional technique and the present invention. For example, according to the above described Patent Document 2, the ASS light generation amount is estimated from a correlation between the intensity of pump light required for the Raman amplification and the ASS light generation amount that occurs with the Raman amplification. The correlation between the intensity of pump light and the ASS light generation amount, which is concisely represented by equation (13), is explained by the following equation.

$$\text{Pass} = \sum_i 10^{\left(Passi + \sum_{j \neq i} \gamma_{ij} P_{pumpj}\right)/10} \quad (19)$$

$$Passi = a_i P_{pumpi}^2 + b_i P_{pumpi} + c_i \quad (20)$$

Equation (20) represents the correlation between the intensity $P_{pumpi}$ of pump light i of a certain wavelength, which is a part of the pump light source of the Raman amplifier, and the ASS light generation amount Passi, which occurs with the Raman amplification using the pump light intensity $P_{pumpi}$, with a 2nd-order approximation formula. In equation (20), the intensity $P_{pumpi}$ of the pump light i is a value represented in a linear unit such as milliwatts, etc., and the ASS light generation amount Passi is a value represented in a logarithmic unit such as dBm, etc.

Equation (19) represents the result of totaling the elements of the wavelengths of pump lights by adding, to the ASS light generation amount Passi in equation (20), the amplification amount of ASS light $\gamma_{ij} P_{pumpj}$ when the generation amount Passi of ASS light of the pump light i is Raman-amplified with the intensity $P_{pumpj}$ of another pump light j that differs from the wavelength of the pump light i related to equation (20). Here, $\gamma_{ij}$ indicates an amplification coefficient when the ASS light generation amount Passi is Raman-amplified with the intensity $P_{pumpj}$ of the pump light j. With equation (19), the ASS light generation amount Pass is calculated by converting the ASS light generation amount that occurs with the wavelength of each pump light into a linear unit using the power of 10, and by totaling the elements.

With the method for estimating the ASS light generation amount that is explained with equations (19) and (20), the estimation result of the ASS light generation amount is dependent on the intensity of pump light. Therefore, the following problem occurs.

FIG. 12 shows the results of comparisons made between the intensities of pump lights required for the Raman amplification of the gain of 10 dB for fibers having various optical characteristics. Here, the type of transmission line fibers and the local loss of a repeater station where the Raman amplifier is placed are assumed to be DSF and 0.5 dB respectively. Since the comparison is made among the fibers having various optical characteristics, their loss coefficients vary from 0.21 dB/km to 0.29 dB/km in units of 0.01 dB/km. FIG. 12 shows the tendency of the intensity of pump light needed for a required gain to increase as the loss coefficient becomes large even if the type of fiber is the same.

Additionally, the intensity of pump light and the ASS light generation amount have a monotonically increasing relationship. The Raman amplifier has the ability to estimate the intensity of ASS light generation in order to accurately control gain or the intensity of signal light. With a conventional technique, estimation is made, for example, by using equation (13) as a relationship between the intensity of pump light with reference to a fiber having a certain optical characteristic and the ASS light generation amount that occurs with the Raman amplification.

A case where the local loss and the loss coefficient are 0.5 dB and 0.25 dB/km, respectively, as the optical characteristic of a fiber used as a reference is assumed. In this case, the intensity of pump light required for the Raman amplification of a gain of 10 dB is 309 mW for a fiber that has a loss coefficient of 0.25 dB/km, which is used as a reference, whereas the required intensity of pump light is 351 mW for a fiber having a loss coefficient of 0.29 dB/km, as shown in FIG. 12.

FIG. 16 shows the intensities of pump light required for the Raman amplification and the ASS light generation amounts in a case in which Raman gains of 10 dB and 13 dB are respectively required for transmission line fibers of three types, such as fibers with loss coefficients of 0.21 dB/km, 0.25 dB/km, and 0.29 dB/km, respectively. Also, the ASS light generation amounts that are estimated with the conventional technique based on equation (13) and with the method according to the present invention are shown in FIG. 16.

Figure 17:
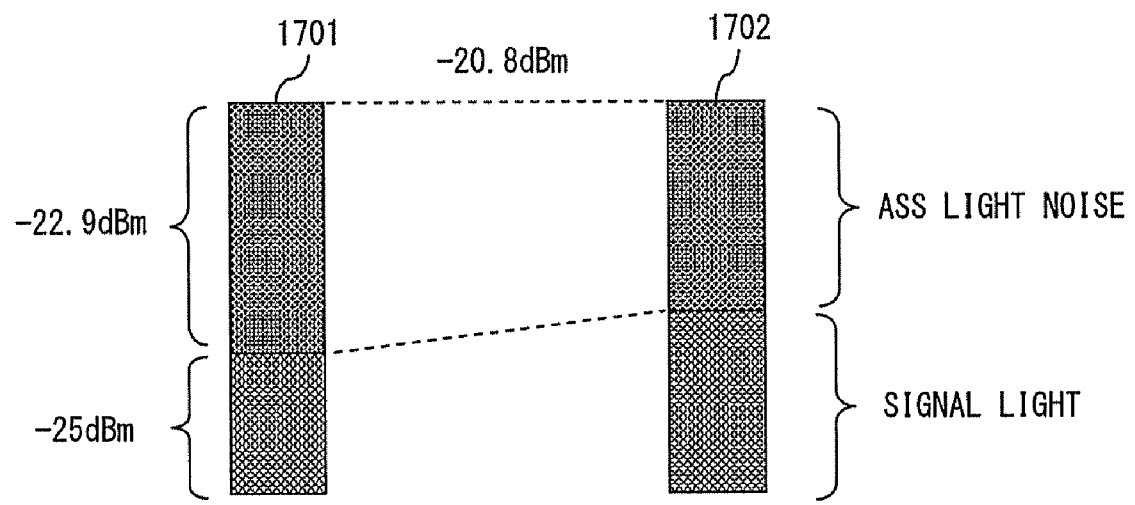
FIG. 17 shows the breakdown of the intensity of light based on the result of conventional estimation of the ASS light generation amount, and an actual breakdown.

FIG. 17 shows the estimation results of the ASS light generation amount Pass from the intensity of pump light pursuant to equation (13) if a Raman gain $G_R$=10 dB and an intensity of signal light $P_{on}(\lambda_{sig})$=−25 dBm after being Raman-amplified are required. In FIG. 17, the breakdown of the signal light and the ASS light in the estimation result 1701 is proved to be different from an actual breakdown 1702.

As shown in FIGS. 16 and 17, with the conventional estimation method, Pass=−22.9 dBm is obtained with a pump light intensity of 351 mW, which is required for a fiber with a loss coefficient of 0.29 dB/km.

If the loss coefficient of a fiber connected to the Raman amplifier is 0.29 dB/km when the ASE light accumulated noise component Paccum=0 mW is assumed, Pass=−22.9 dBm is estimated on the basis of the assumption that the loss coefficient used as a reference is 0.25 dB/km. Therefore, the intensity of pump light is controlled by setting the intensity of all of the lights Pall_target=$P_{on}(\lambda_{sig})$+Pass=(−25 dBm)+(−22.9 dBm)=−20.8 dBm as a target value according to equation (17).

However, the loss coefficient of the fiber that is an amplification medium is large, and the actual ASS light generation amount is −24.3 dBm, which is smaller than −22.9 dB. The intensity of signal light is controlled to be $P_{on}(\lambda_{sig})$=Pall_target−Pass=(−20.8 dBm)−(−24.3 dBm)=−23.4 dBm due to this estimation error of the ASS light generation amount, and a control error of 1.6 dB in the signal light intensity is also caused. In a long-distance transmission system where repeater stations are connected in multiple stages, this control error may deteriorate the quality of the signal-to-noise characteristic or the like.

FIG. 13 shows the results of a comparison made between the ASS light generation amount that occurs with the Raman amplification using a predetermined gain for fibers having various optical characteristics. Here, the type of the transmission line fiber and the local loss of the repeater station where the Raman amplifier is placed are DSF and 0.5 dB, respectively. Since the comparison is made between fibers having various optical characteristics, three loss coefficients, 0.21 dB/km, 0.25 dB/km, and 0.29 dB/km, are used.

FIG. 13 shows that the ASS light generation amount is not influenced by the optical characteristic of a transmission line fiber that serves as an amplification medium under the condition that the gain of the Raman amplifier is constant. As shown in FIG. 11, the ASS light generation amount that occurs with the Raman amplification with a gain of 10 dB is −24.2 dBm for a fiber that is used as a reference and that has a loss coefficient of 0.25 dB/km, whereas the ASS light generation amounts are −24.1 dBm and −24.3 dBm, respectively, for fibers with loss coefficients of 0.21 dB/km and 0.29 dB/km and they are almost the same.

With the estimation method according to the present invention, the ASS light generation amount is estimated from the Raman gain $G_R$ by using the relationship shown in FIG. 13. The correlation between the Raman gain $G_R$ and the ASS light generation amount Pass, which is concisely represented by equation (14), is represented as the following equation by using the characteristic of the Raman gain $G_R$ and the ASS light generation amount Pass.

$$\text{Pass} = G_{R\_}\text{coeff3} \times G_R^3 + G_{R\_}\text{coeff2} \times G_R^2 + G_{R\_}\text{coeff1} \times G_R + G_{R\_}\text{coeff0} \quad (21)$$

Equation (21) represents the correlation between the Raman gain $G_R$ and the ASS light generation amount Pass with a 3rd-order approximation formula. $G_{R\_}\text{coeff0}$ to $G_{R\_}\text{coeff3}$ represent the coefficients of terms of the Raman gain $G_R$. Here, equation (21) is an equation represented in a logarithmic unit, and the ASS light generation amount Pass is a value represented in a logarithmic unit. If a plurality of combinations of these coefficients are stored in accordance with the types of transmission line fibers, the correlation between the Raman gain $G_R$ and the ASS light generation amount Pass can be selected in accordance with the type of transmission line fiber being used.

FIG. 16 also shows the results of estimation of the ASS light generation amount Pass with the method according to the present invention when a Raman gain $G_R$=10 dB and a signal light intensity $P_{on}(\lambda_{sig})$=−25 dBm after being Raman-amplified are required. Here, it is assumed that the loss coefficient of the transmission line fiber, the transmission line fiber length, the optical loss of the transmission line, and the ASE light accumulated noise component are 0.25 dB/km, 75 km, LOSS($\lambda_{sig}$)=0.25 dB/km×75 km=18.75 dB, and Paccum=0 mW, respectively.

Initially, equation (21), which represents the correlation between the Raman gain $G_R$ of the fiber having an optical characteristic used as a reference and the ASS light generation amount Pass, is prepared beforehand. By using this equation (21), the ASS light generation amount that occurs with the Raman amplification with the required gain $G_R$=10 dB can be estimated as Pass=−24.2 dBm.

Next, the intensity of pump light is controlled pursuant to equation (17), which is an equation represented in a linear unit, by setting the intensity of all of the lights Pall_target=$10^{(P_{on}(\lambda_{sig})/10)}$+Pass=$10^{((-25\ dBm)/10)}$+$10^{((-24.2\ dBm)/10)}$=−21.6 dBm as a target value.

If the optical characteristic of the transmission line fiber varies and its loss coefficient becomes a large value such as 0.29 dB/km, the optical loss of the transmission line varies to LOSS($\lambda_{sig}$)=0.29 dB/km×75 km=21.75 dB. In this case, $P_{on}(\lambda_{sig})$=−25 dBm is required as the intensity of signal light after being Raman-amplified. Therefore, the required Raman gain results in $G_R$=13 dB. Here, if 13 dB is used as $G_R$ of equation (21), Pass=−21.5 dBm can be estimated.

Then, the intensity of pump light is similarly controlled pursuant to equation (17) as described above by setting the intensity of all of the lights Pall_target=$10^{(P_{on}(\lambda_{sig})/10)}$+Pass=$10^{((-25\ dBm)/10)}$+$10^{((-21.5\ dBm)/10)}$=−19.9 dBm as a target value.

Even if the actual ASS light generation amount becomes −21.6 dBm with a change in the loss coefficient from 0.25 dB/km to 0.29 dB/km, Pass=−21.5 dBm can be estimated with the method according to the present invention. Therefore, the estimation error becomes very small. As a result, even if the loss coefficient varies, the intensity of signal light is controlled to be $P_{on}(\lambda_{sig})$=Pall_target-Pass=$10^{((-19.9\ dBm)/10)}$−$10^{((-21.6\ dBm)/10)}$=−24.8 dBm, and the control error of the signal light intensity significantly improves in comparison with the conventional estimation method. In consequence, the signal light intensity can be accurately controlled, and the quality of the signal to noise characteristic, etc. of the optical transmission system can be improved.

As described above, with the estimation method according to the present invention, the ASS light generation amount can be estimated with a high accuracy by using the phenomenon that a difference does not occur in the ASS light generation amount when the Raman gain is constant for fibers having various optical characteristics. As a result, the Raman gain or the intensity of signal light after being Raman-amplified can be accurately controlled. Furthermore, the ASS light generation amount based on the Raman gain can be estimated appropriately against a change in the characteristic of an optical fiber that occurs with secular changes and environmental condition changes by continuously monitoring the Raman gain on the basis of the loss of signal light in the transmission line fiber.

A method for estimating the ASS light generation amount with a configuration simpler than that of FIG. 5 is described next. With this method, a Raman gain or the intensity of signal light is accurately controlled by estimating the intensity of ASS light generation with a high accuracy by using the simpler configuration from a required Raman gain or a required intensity of signal light, although the ability to continuously monitor the optical characteristic of a transmission line fiber is not comprised.

Figure 18:
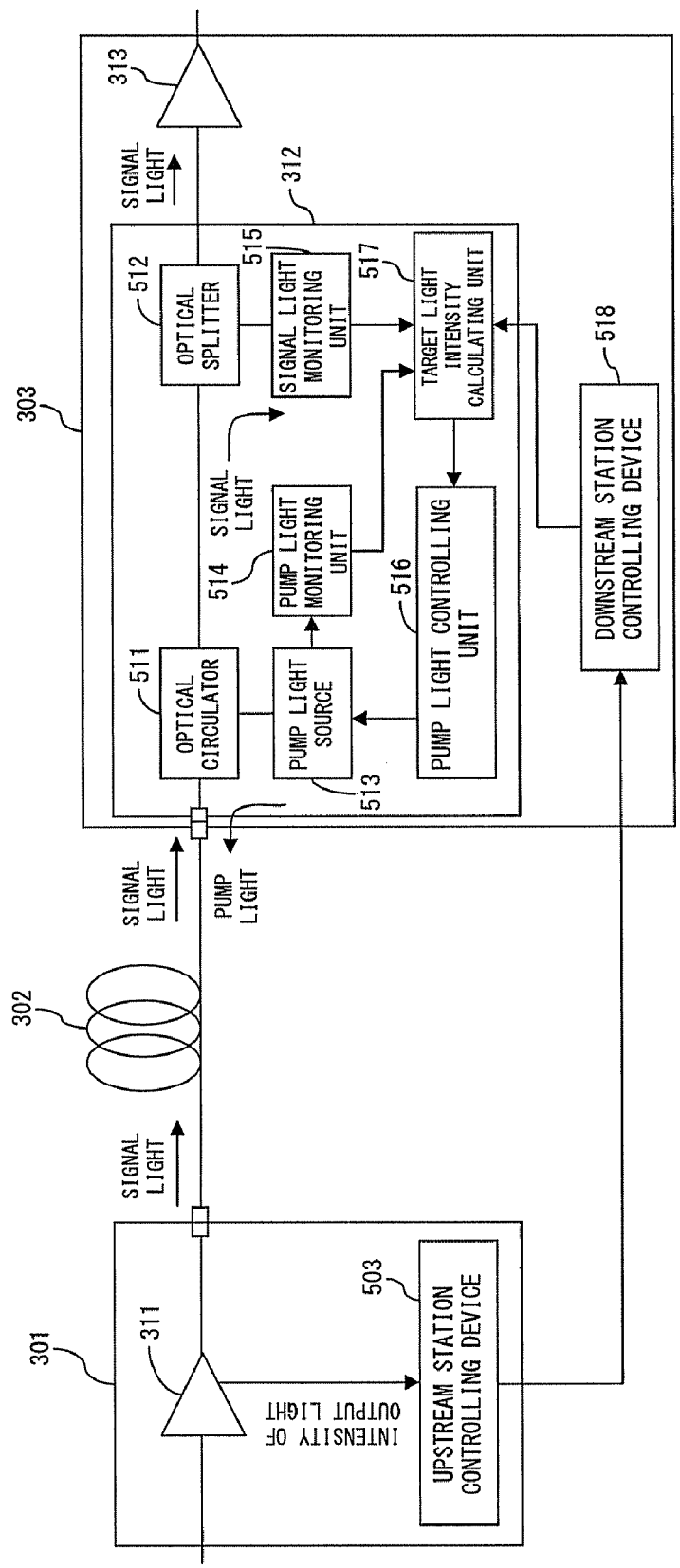
FIG. 18 shows a second configuration of upstream and downstream repeater stations.

FIG. 18 shows such configurations of transmitting devices of upstream repeater station 301 and downstream repeater station 303. The configuration of the downstream repeater station 303 is similar to that of FIG. 5, whereas the upstream repeater station 301 has a configuration implemented by removing the pump light extracting unit 501 and the pump light monitoring unit 502 from the configuration of FIG. 5. Units of the Raman amplifier 312 placed in the downstream repeater station 303, and the operations of the output light monitoring unit within the EDFA 311 of the upstream repeater station 301 are fundamentally similar to those in the configuration of FIG. 5.

The upstream station controlling device 503 receives the intensity of output signal light, which is monitored by the output light monitoring unit, and transmits information about the intensity of output signal light and an ASE light accumulated noise component to the downstream station controlling device 518.

The downstream station controlling device 518 monitors an operational state, such as the state of the transmission line fiber 302 or the like, between adjacent stations on the basis of the information received from the upstream controlling device 503, and controls the Raman amplifier 312. The downstream station controlling device 518 can also control all or some of the constituent elements of the transmitting device placed in the downstream repeater station 303 that includes the Raman amplifier 312. Otherwise, only the Raman amplifier 312 may be controlled by providing the downstream controlling device 518 within the Raman amplifier 312.

In the intensity of light Pall_obs, which reaches the signal light monitoring unit 515 within the Raman amplifier 312, Raman-amplified signal light $P_{on}(\lambda_{sig})$, the ASS light generation amount Pass, and the accumulated noise component Paccum such as ASE light, etc. coexist, and Pall_obs is represented by equation (12). The ASS light generation amount Pass is calculated by the target light intensity calculating unit 517. An accumulated noise component accumulated from the transmitting end station to the upstream repeater station 301 is reported from the upstream station controlling device 503 as the accumulated noise component Paccum.

For a Raman amplifier used in a long-distance transmission system, the ability to accurately Raman-amplify the intensity of signal light is required to optimize the signal-to-noise optical characteristic of a transmitting device. In the configuration shown in FIG. 18, the ASS light generation amount Pass is estimated with a high accuracy by using a Raman gain $G_R$ pursuant to the following procedures, and the intensity of pump light emitted from the pump light source 513 is controlled so that the intensity of signal light $P_{on}(\lambda_{sig})$ after being Raman-amplified becomes a predetermined intensity.

Procedure 1: The loss of signal light LOSS($\lambda_{sig}$) in the transmission line fiber 302 is measured pursuant to equation (4) when the pump light of the Raman amplifier 312 is not output, similar to procedure 1 of the above described monitoring method. The loss of signal light may be measured, for example, at the time of setup of the transmitting device when the Raman amplifier 312 is set up.

Procedure 2: Pump light is made incident from the pump light source 513 of the Raman amplifier 312 to the transmission line fiber 302 in a state in which signal light passes through the transmission line fiber 302, and the intensity of the pump light is controlled so that the intensity of the signal light, or the intensity of all of the lights that include the ASS light generation amount and the accumulated noise component reaches a predetermined value.

Procedure 3: The ASS light generation amount becomes almost the same intensity regardless of the optical characteristic of the transmission line fiber that serves as an amplification medium under the condition that the gain of the Raman amplifier 312 is constant. By using this characteristic, the ASS light generation amount Pass can be estimated with a higher accuracy from the approximation formula related to the Raman gain $G_R$, similar to procedure 3 of the above described controlling method.

Equation (14) is used as the function of the ASS light generation amount Pass related to the Raman gain $G_R$. Pursuant to equation (14), the ASS light generation amount Pass that occurs with the Raman effect can be estimated with a high accuracy when the Raman amplifier 312 is controlled with the Raman gain $G_R$.

Additionally, if the Raman amplifier 312 is controlled so that the intensity of signal light after being Raman-amplified reaches $P_{on}(\lambda_{sig})$, the Raman gain $G_R$ required to estimate the ASS light generation amount is obtained with equations (15) and (16).

The intensity of signal light $P_{off}(\lambda_{sig})$ when the Raman amplification is not performed—in other words, when pump light is not emitted from the Raman amplifier 312 to the transmission line fiber 302—is obtained from the transmission line loss of the signal light LOSS($\lambda_{sig}$), which is obtained with procedure 1, and the intensity of output signal light $P_{out}(\lambda_{sig})$, which is monitored by the output light monitoring unit, by using equation (15).

If the intensity of signal light after being Raman-amplified is $P_{on}(\lambda_{sig})$, a required Raman gain $G_R$ is obtained with equation (16). The ASS light generation amount Pass when the Raman gain is $G_R$ can be obtained by applying the obtained Raman gain $G_R$ to equation (14).

Procedure 4: The intensity of pump light is controlled so that the intensity of all of the lights Pall_obs, which is monitored by the signal light monitoring unit 515, becomes a predetermined intensity, in order to obtain a desired gain $G_R$ or a desired intensity of signal light $P_{on}(\lambda_{sig})$.

If the control target of the Raman amplifier 312 is to reach the Raman gain $G_R$, the ASS light generation amount Pass is represented by a mathematical expression where the Raman gain $G_R$ is used as a variable as indicated by FIG. 13 or by equation (14). The intensity of signal light $P_{on}(\lambda_{sig})$, which is Raman-amplified with the Raman gain $G_R$, can be represented by $P_{on}(\lambda_{sig}) = P_{off}(\lambda_{sig}) \times G_R$. Accordingly, the intensity of all of the lights Pall_target with which a desired gain $G_R$ is reached can be obtained with equation (17).

If the intensity of all of the lights Pall_obs reaches a desired intensity, which is obtained with equation (17), this means that the Raman amplifier 312 has reached a desired Raman gain or a desired signal light intensity.

Additionally, since Pall_target, Paccum, and $P_{off}(\lambda_{sig})$ in equation (17) are obtained by the signal light monitoring unit 515, the upstream station controlling device 503, and equation (15), respectively, equation (17) is represented as a relational expression of one variable related to $G_R$. Accordingly, the Raman gain $G_R$ can be obtained by solving equation (17). The intensity of pump light may be controlled so that the Raman gain $G_R$, which is obtained by solving equation (17), reaches a gain required for the Raman amplifier 312.

When a desired Raman gain or a desired intensity of signal light is not reached even when the intensity of pump light is controlled pursuant to procedure 4, the processes of procedures 5 and later of the above described monitoring method are executed subsequently to procedure 4.

As described above, according to the present invention, the following effects can be obtained.

(1) The optical loss of a transmission line fiber in the wavelength of signal light is monitored on the basis of the intensity of pump light that the Raman amplifier supplies to the transmission line fiber, the residual intensity of pump light after passing through the transmission line fiber, and the wavelength characteristic of the optical loss of the transmission line fiber, whereby a change in the optical characteristic of the transmission line fiber can be monitored, and an abnormality such as a disconnection, an excessive loss, etc. of the transmission line fiber can be detected.

(2) When Raman amplification is performed on optical fibers of the same type with the same gain, ASS light having almost the same intensity occurs with the Raman amplification even if the optical fibers have various optical characteristics. By using this property, the intensity of ASS light generated is estimated as the function of the Raman gain in accordance with the type of transmission line fiber. As a result, the intensity of ASS light generated can be estimated with a high accuracy.

(3) The intensity of pump light is controlled by setting the intensity of all of the lights, which is obtained from the estimation result of the intensity of ASS light generated, as a control target while the optical loss of a transmission line fiber in the wavelength of signal light is being monitored, whereby a desired Raman gain or a desired intensity of signal light after being Raman-amplified can be accurately obtained even if the optical characteristic of the transmission line fiber varies during the operations of the Raman amplifier.

What is claimed is:

1. A Raman amplifier for amplifying signal light that includes communication information from an upstream station by using a transmission line fiber, and for receiving the amplified signal light, comprising:
   a pump light source to supply pump light to the transmission line fiber toward the upstream station;
   a signal light monitoring unit to measure an intensity of the received signal light;
   a target calculating unit to calculate a corresponding intensity of amplified spontaneous scattering light from a required Raman gain by using a correlation between a Raman gain and an intensity of amplified spontaneous scattering light that occurs with Raman amplification, and to calculate a target light intensity for a total intensity of the amplified spontaneous scattering light and the amplified signal light from the obtained intensity of amplified spontaneous scattering light and an intensity of the amplified signal light; and
   a pump light controlling unit to control the intensity of the pump light output from the pump light source so that the intensity of light measured by the signal light monitoring unit becomes equivalent to the target light intensity calculated by the target calculating unit.

2. The Raman amplifier according to claim 1, wherein the target calculating unit selects the correlation between the Raman gain and the intensity of amplified spontaneous scattering light depending on a type of the transmission line fiber.

3. The Raman amplifier according to claim 1, wherein
   the target calculating unit calculates a Raman gain by using the intensity of signal light, which is measured by the signal light monitoring unit in a state in which the pump light is not supplied to the transmission line fiber, the intensity of light, which is measured by the signal light monitoring unit in a state in which the intensity of the pump light supplied to the transmission line fiber reaches an upper limit, and the correlation between the Raman gain and the intensity of amplified spontaneous scattering light, and outputs information indicating that the Raman gain or the intensity of signal light is insufficient if the obtained Raman gain does not reach the required Raman gain.

4. The Raman amplifier according to claim 1, wherein
the target calculating unit receives information about an intensity of accumulated noise light from the upstream station, and calculates the target light intensity from the received intensity of accumulated noise light, the intensity of amplified spontaneous scattering light, and the intensity of the amplified signal light.

5. The Raman amplifier according to claim 4, wherein
the target calculating unit calculates a Raman gain by using the intensity of accumulated noise light, the intensity of signal light, which is measured by the signal light monitoring unit in a state in which the pump light is not supplied to the transmission line fiber, the intensity of light, which is measured by the signal light monitoring unit in a state in which the intensity of the pump light supplied to the transmission line fiber reaches an upper limit, and the correlation between the Raman gain and the intensity of amplified spontaneous scattering light, and outputs information a message reporting indicating that the Raman gain or the intensity of signal light is insufficient if the obtained Raman gain does not reach the required Raman gain.

6. The Raman amplifier according to claim 1, further comprising:
a pump light monitoring unit to measure the intensity of the pump light supplied from the pump light source to the transmission line fiber, wherein
the target calculating unit receives from the upstream station the intensity of signal light output from the upstream station to the transmission line fiber in a state in which the pump light is not supplied to the transmission line fiber; calculates an optical loss of the transmission line fiber at a wavelength of the signal light when the pump light is not output, from the received intensity of output signal light and the intensity of signal light measured by the signal light monitoring unit; receives from the upstream station information about a residual intensity of the pump light that reaches the upstream station after passing through the transmission line fiber and information about the intensity of output signal light in a state in which the pump light is supplied to the transmission line fiber; calculates an optical loss of the transmission line fiber at the wavelength of the signal light when the pump light is output, from the received residual intensity of the pump light, the intensity of the pump light, which is measured by the pump light monitoring unit, and the optical loss when the pump light is not output; and calculates the intensity of the amplified signal light from the received intensity of output signal light, the optical loss when the pump light is output, and the required Raman gain.

7. The Raman amplifier according to claim 1, further comprising:
a pump light monitoring unit to measure the intensity of the pump light supplied from the pump light source to the transmission line fiber, wherein
the target calculating unit receives from the upstream station the intensity of signal light output from the upstream station to the transmission line fiber in a state in which the pump light is not supplied to the transmission line fiber; calculates an optical loss of the transmission line fiber at a wavelength of the signal light when the pump light is not output, from the received intensity of output signal light and the intensity of signal light, which is measured by the signal light monitoring unit; receives from the upstream station information about a residual intensity of the pump light that reaches the upstream station after passing through the transmission line fiber and information about the intensity of output signal light in a state in which the pump light is supplied to the transmission line fiber; calculates an optical loss of the transmission line fiber at a wavelength of the signal light when the pump light is output, from the received residual intensity of the pump light, the intensity of the pump light, which is measured by the pump light monitoring unit, and the optical loss when the pump light is not output; calculates the required Raman gain from the received intensity of output signal light, the optical loss when the pump light is output, and an intensity of signal light that is required after Raman amplification; calculates the intensity of the amplified spontaneous scattering light from the obtained Raman gain; and calculates the target light intensity by using the intensity of signal light that is required after the Raman amplification as the intensity of the amplified signal light.

8. The Raman amplifier according to claim 1, further comprising:
a pump light monitoring unit to measure the intensity of the pump light supplied from the pump light source to the transmission line fiber, wherein
the target calculating unit receives from the upstream station the intensity of signal light output from the upstream station to the transmission line fiber in a state in which the pump light is not supplied to the transmission line fiber; calculates an optical loss of the transmission line fiber at a wavelength of the signal light when the pump light is not output, from the received intensity of output signal light and the intensity of signal light, which is measured by the signal light monitoring unit; receives from the upstream station information about the intensity of output signal light in a state in which the pump light is supplied to the transmission line fiber; and calculates the intensity of the amplified signal light from the received intensity of output signal light, the optical loss when the pump light is not output, and the required Raman gain.

9. The Raman amplifier according to claim 1, further comprising:
a pump light monitoring unit to measure the intensity of the pump light supplied from the pump light source to the transmission line fiber, wherein the target calculating unit receives from the upstream station the intensity of signal light output from the upstream station to the transmission line fiber in a state in which the pump light is not supplied to the transmission line fiber; calculates an optical loss of the transmission line fiber at a wavelength of the signal light when the pump light is not output from the received intensity of output signal light and the intensity of signal light, which is measured by the signal light monitoring unit; receives from the upstream station information about the intensity of output signal light in a state in which the pump light is supplied to the transmission line fiber; calculates the required Raman gain from the received intensity of output signal light, the optical loss when the pump light is output, and an intensity of signal light that is required after Raman amplification; calculates the intensity of the amplified spontaneous scattering light from the obtained Raman gain, and calculates the target light intensity by using the intensity of signal light that is required after the Raman amplification as the intensity of the amplified signal light.

10. A Raman-amplifying method for amplifying signal light by using a transmission line fiber in a downstream station that receives signal light that is output from an upstream station to the transmission line fiber and includes communication information, comprising:

supplying pump light to the transmission line fiber toward the upstream station;

measuring an intensity of the signal light received from the upstream station;

calculating a corresponding intensity of amplified spontaneous scattering light from a required Raman gain by using a correlation between a Raman gain and an intensity of amplified spontaneous scattering light that occurs with Raman amplification;

calculating a target light intensity for a total intensity of the amplified spontaneous scattering light and the amplified signal light from the obtained intensity of the amplified spontaneous scattering light and the intensity of the amplified signal light; and controlling the intensity of the pump light so that the measured intensity of light becomes equivalent to the target light intensity calculated by the calculating the target light intensity for the total intensity.

* * * * *